US012009170B2

(12) United States Patent
Katakami et al.

(10) Patent No.: US 12,009,170 B2
(45) Date of Patent: Jun. 11, 2024

(54) ELECTROMAGNETIC RELAY AND METHOD OF MANUFACTURING ELECTROMAGNETIC RELAY

(71) Applicant: DENSO ELECTRONICS CORPORATION, Anjo (JP)

(72) Inventors: Taisuke Katakami, Anjo (JP); Naoki Uejima, Anjo (JP)

(73) Assignee: DENSO ELECTRONICS CORPORATION, Anjo (JP)

( * ) Notice: Subject to any disclaimer, the term of this patent is extended or adjusted under 35 U.S.C. 154(b) by 77 days.

(21) Appl. No.: 17/943,360

(22) Filed: Sep. 13, 2022

(65) Prior Publication Data

US 2023/0005687 A1 Jan. 5, 2023

Related U.S. Application Data

(63) Continuation of application No. PCT/JP2021/006741, filed on Feb. 24, 2021.

(30) Foreign Application Priority Data

Mar. 18, 2020 (JP) ................................ 2020-048078

(51) Int. Cl.

| | |
|---|---|
| ***H01H 50/36*** | (2006.01) |
| ***H01H 49/00*** | (2006.01) |
| ***H01H 50/02*** | (2006.01) |
| ***H01H 50/14*** | (2006.01) |
| ***H01H 50/44*** | (2006.01) |

(52) U.S. Cl.

CPC .......... *H01H 50/023* (2013.01); *H01H 49/00* (2013.01); *H01H 50/14* (2013.01); *H01H 50/36* (2013.01); *H01H 50/44* (2013.01)

(58) Field of Classification Search

CPC ...... H01H 50/023; H01H 49/00; H01H 50/14; H01H 50/36; H01H 50/44; H01H 50/045; H01H 50/546; H01H 2050/025

See application file for complete search history.

(56) References Cited

U.S. PATENT DOCUMENTS 5,892,194 A 4/1999 Uotome et al.
6,903,638 B2 * 6/2005 Nakamura ........... H01H 50/042 335/162

(Continued)

FOREIGN PATENT DOCUMENTS

JP H09259728 A 10/1997

*Primary Examiner* — Shawki S Ismail
*Assistant Examiner* — Lisa N Homza
(74) *Attorney, Agent, or Firm* — Harness, Dickey & Pierce, P.L.C.

(57) ABSTRACT

A press-fit fixing portion fixes a drive unit and a relay unit by press-fitting a claw portion and the recess portion. A sealing member is provided on an outside of the relay unit and the drive unit. An inner cover forms a sealed space for sealing an arc-extinguishing gas together with the sealing member. An electromagnetic relay is configured to make it possible both an adjustment of a press-fitting amount of the claw portion and the recess portion and an adjustment of the gap between a ceramic insulator at an end of a shaft and a movable element by making each of the relay unit and the drive unit in a manufacturing process to the same state as in when a magnetizing coil is energized.

8 Claims, 20 Drawing Sheets

(56) References Cited

U.S. PATENT DOCUMENTS

| | | | | |
|---|---|---|---|---|
| 8,138,863 | B2 * | 3/2012 | Tanaka | H01H 50/38 335/131 |
| 8,138,872 | B2 * | 3/2012 | Yoshihara | H01H 50/36 335/185 |
| 8,164,404 | B2 * | 4/2012 | Kamiya | H01H 50/12 335/201 |
| 8,179,217 | B2 * | 5/2012 | Kawaguchi | H01H 51/2209 335/85 |
| 11,621,136 | B2 * | 4/2023 | Mori | H01H 50/14 335/185 |
| 11,721,507 | B2 * | 8/2023 | Nishida | H01H 50/546 335/185 |
| 11,791,119 | B2 * | 10/2023 | Miyake | H01H 50/44 335/185 |
| 2011/0032059 | A1 * | 2/2011 | Ito | H01H 50/14 218/25 |
| 2023/0090245 | A1 * | 3/2023 | Zhong | H01H 50/18 335/185 |
| 2023/0101203 | A1 * | 3/2023 | Minowa | H01H 9/44 335/185 |
| 2023/0245845 | A1 * | 8/2023 | Minowa | H01H 9/443 335/185 |

* cited by examiner

ELECTROMAGNETIC RELAY AND METHOD OF MANUFACTURING ELECTROMAGNETIC RELAY

CROSS REFERENCE TO RELATED APPLICATIONS

The present application is a continuation application of International Patent Application No. PCT/JP2021/006741 filed on Feb. 24, 2021, which designated the U.S. and is based on and claims the benefit of priority from Japanese Patent Application No. 2020-48078 filed on Mar. 18, 2020, the entire disclosure of the above application is incorporated herein by reference.

TECHNICAL FIELD

The disclosure of this specification relates to a closed type electromagnetic relay and a method of manufacturing the same.

BACKGROUND

An electromagnetic relay fills an arc-extinguishing gas in a sealed space. Therefore, the electromagnetic relay requires both a process of adjusting a gap for turning on and off a circuit and a process of forming the sealed space. In the above aspects, or in other aspects not mentioned, there is a need for further improvements in an electromagnetic relay and a method of manufacturing the same.

SUMMARY

An electromagnetic relay disclosed in this specification has the following configurations. A drive unit includes a magnetizing coil which forms a magnetic field by energization, a fixed core which is placed on a side of an inner diameter of the magnetizing coil, a yoke which accommodates the magnetizing coil and the fixed core, a movable core which is movable relative to the fixed core, a shaft which is able to reciprocate in an axial direction and is fixed to the movable core and a return spring which urges the movable core in a direction away from the fixed core. A relay unit includes a frame made of an insulating material, a fixed terminal fixed to the frame, a movable element which is provided on a side opposite to the movable core with respect to the fixed terminal and is movable relative to the fixed terminal, and a contact pressure spring which urges the movable element to a side to the fixed terminal. A press-fit fixing portion which fixes the drive unit and the relay unit by press-fitting a claw portion provided on one of the yoke or the frame and a recess portion provided on the other one. A sealing member in a plate-shape is provided outside the relay unit and the drive unit. The external connection terminal is fixed to the sealing member while being inserted through a hole of the sealing member, and is joined to the fixed terminal. The inner cover is joined to the sealing member in a state in which the drive unit and the relay unit are accommodated therein, and forms a sealed space for sealing the arc-extinguishing gas inside together with the sealing member.

The electromagnetic relay is configured to be able to adjust a gap between the end of the shaft and the movable element and be able to adjust a press-fitting amount between the claw portion and the recess portion, by bringing them into a state where the movable contact of the movable element and the fixed contact of the fixed terminal come into contact with each other, and the movable component and the fixed core come into contact with each other, in a state before attaching the sealing member and the inner cover. The movable component means any of a shaft, a movable core, and a component that moves integrally with them.

According to this, in the manufacturing process, the electromagnetic relay enables to adjust the gap formed between the end of the shaft and the movable element when the magnetizing coil is energized, at a state before assembling the sealing member and the inner cover to an intermediate product in which the drive unit and the relay unit are combined. Then, after adjusting the gap, the external connection terminal fixed to the sealing member and the fixed terminal are joined, the sealing member and the inner cover are joined, and the arc extinguishing gas is injected into the closed space formed by the sealing member and the inner cover. Therefore, since a potential process which may act stress on the drive unit or the relay unit after adjusting the gap between the end of the shaft and the movable element is only a joining process for the external connection terminal and the fixed terminal, it is possible to suppress changing of the gap. Therefore, the electromagnetic relay 1 is possible to reduce differences of the gap Gs for each product in a configuration in which the drive unit 10 and the relay unit 20 are accommodated in the closed space in which the arc extinguishing gas is sealed.

In the case that an insulating member such as a ceramic insulator is fixed to an end of the shaft on a side to the movable element, the end of the shaft means the end of the insulating member.

The method of manufacturing an electromagnetic relay disclosed in this specification includes the following steps. First, it prepares a drive unit in which a magnetizing coil which forms a magnetic field by energization, a fixed core which is placed on a side of an inner diameter of the magnetizing coil, a yoke which accommodates the magnetizing coil and the fixed core, a movable core which is movable relative to the fixed core, a shaft which is able to reciprocate in an axial direction and is fixed to the movable core and a return spring which urges the movable core in a direction away from the fixed core are assembled. It prepares a relay unit in which a frame made of an insulating material, a fixed terminal fixed to the frame, a movable element which is provided on a side opposite to the movable core with respect to the fixed terminal and is movable relative to the fixed terminal, and a contact pressure spring which urges the movable element to a side to the fixed terminal are assembled. It fixes the drive unit and the relay unit by adjusting a press-fitting amount of the claw portion provided on one of the yoke or the frame and the recess portion provided on the other side so that a gap between the end of the shaft and the movable element is adjusted to have a predetermined size in a state where the movable contact included in the movable element and the fixed contact included in the fixed terminal are brought into contact with each other and the movable component and the fixed core are brought into contact with each other. It fixes the sealing member and the external connection terminal in a state where the external connection terminal is inserted through a hole of the sealing member in a plate shape. It joins the external connection terminal and the fixed terminal while arranging the sealing member to which the external connection terminal is fixed on an outside of the relay unit and the drive unit. It forms a sealed space inside an inner cover and the sealing member by joining the inner cover in which the drive unit and the relay unit are accommodated therein and the sealing member. It seals an arc-extinguishing gas in the sealed space formed inside the inner cover and the sealing member.

According to this, the gap between the end of the shaft and the movable element is adjusted when the drive unit and the relay unit are fixed by press-fitting the claw portion provided on one of the yoke or the frame and the recess portion provided on the other side. The electromagnetic relay, which accommodates the drive unit and the relay unit in the closed space, is formed by joining the external connection terminal fixed to the sealing member and the fixed terminal, and joining the sealing member and the inner cover, after the above process. Therefore, since a process which may apply stress on the drive unit or the relay unit after adjusting the gap is only a joining process for the external connection terminal and the fixed terminal, it is possible to suppress changing of the gap. Therefore, this method of manufacturing an electromagnetic relay is possible to reduce differences of the gap Gs for each product in a configuration in which the drive unit and the relay unit are accommodated in the closed space in which the arc extinguishing gas is sealed.

A reference numeral in parentheses attached to each component or the like indicates an example of correspondence between the component or the like and specific component or the like described in embodiments below.

DETAILED DESCRIPTION

Figure 1:
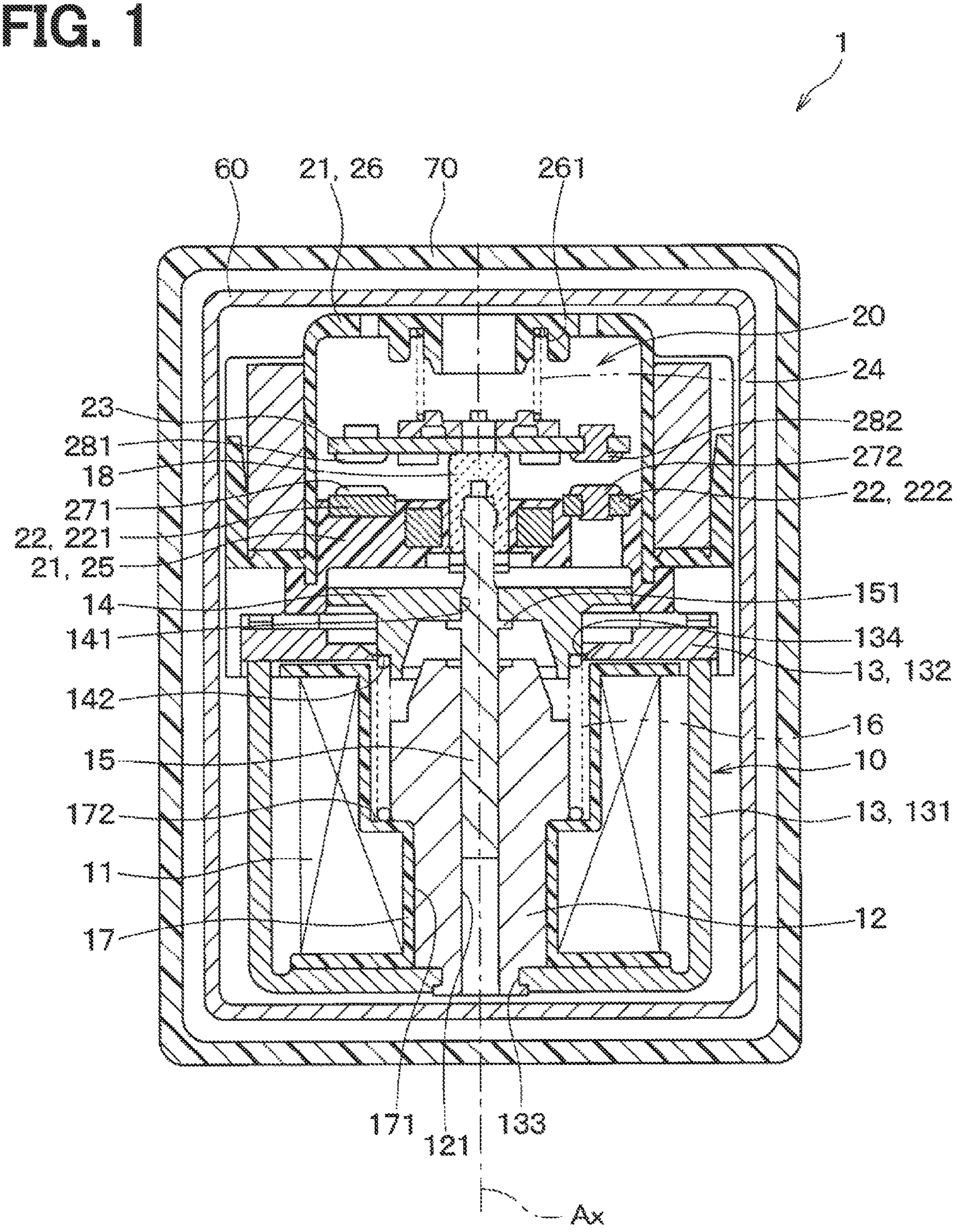
FIG. 1 is a cross-sectional view illustrating an off state of an electromagnetic relay according to a first embodiment.

It is known that a closed type electromagnetic relay in which a relay unit including a movable element and fixed terminals and a drive unit which drives the movable element of the relay unit are accommodated in a closed space sealed with an arc extinguishing gas such as hydrogen.

The closed type electromagnetic relay described in JPH09-259728A has a configuration in which a gap is formed between a movable element of the relay unit and an end of a shaft when the magnetizing coil of the drive unit is energized. The gap works to make the end of the shaft come into contact with the movable element after increasing a kinetic energy of the shaft in response to turning off of an energization of the magnetizing coil of the drive unit. As a result, a speed separating the movable contact of the movable element from the fixed contact of the fixed terminal, i.e., hereinafter referred to as "separating speed" increases, and a current cutoff performance is improved. The electromagnetic relay described in Patent Literature 1 has a configuration in which a size of the gap is adjusted by a screw mechanism provided on the movable core and the shaft of the drive unit. In addition, this electromagnetic relay has a configuration in which a sealed space for sealing the arc extinguishing gas is formed by joining a sealing container which accommodates the fixed terminals and the movable element, a bottomed cylindrical portion which accommodates the fixed core and the movable core, and a plurality of joining members arranged between the sealing container and the bottomed cylindrical portion.

However, in the manufacturing process, the electromagnetic relay described in JPH09-259728A requires a process for joining the plurality of members for forming the closed space by, e.g., welding process after adjusting the gap between the end of the shaft and the movable element by the screw mechanism. Therefore, in the case that heat of the welding process is conducted to the drive unit or the relay unit, the gap may vary for each product.

It is an object of this disclosure in this specification, in view of the above points, to provide an electromagnetic relay and a method for manufacturing the electromagnetic relay which is capable of reducing differences of gaps formed between an end of a shaft and a movable element when a magnetizing coil is energized in a configuration in which a drive unit and a relay unit are accommodated in a sealed space in which an arc extinguishing gas is sealed.

Embodiments of the present disclosure are described herein with reference to the drawings.

First Embodiment

A first embodiment is described below. As shown in FIGS. 1 to 4, the electromagnetic relay 1 includes a drive unit 10, a relay unit 20, a press-fit fixing unit 30, a sealing member 40, external connection terminals 50, an inner cover 60, an outer cover 70, and the like.

The drive unit 10 included in the electromagnetic relay 1 includes a magnetizing coil 11, a fixed core 12, a yoke 13, a movable core 14, a shaft 15, a return spring 16, and the like.

The magnetizing coil 11 is wound around a bobbin 17 and is formed in a substantially circular cylindrical shape. The magnetizing coil 11 forms a magnetic field when it is energized. The fixed core 12 and the like are arranged in a side to an inner diameter of the magnetizing coil 11, i.e., a central hole 171 formed inside the bobbin 17.

The fixed core 12 is a circular cylindrical member made of a magnetic material, and is formed in a size corresponding to the central hole 171 of the bobbin 17. The fixed core 12 has a through hole 121 along a central axis. A part of the shaft 15 is arranged in the through hole 121 in a sliding manner.

The yoke 13 is a member made of a magnetic material, and accommodates the magnetizing coil 11 and the fixed core 12. The yoke 13 is arranged so as to cover a side of an outer periphery and an axial end portion of the magnetizing coil 11. The yoke 13 has a first yoke member 131 and a second yoke member 132.

The first yoke member 131 is a member called a stationary, which has a shape in which a plate material made of a magnetic material is bent into a substantially U shape, and covers a side of the outer periphery of the magnetizing coil 11 and a side of the one end in the axial direction of the magnetizing coil 11. An opening 133 is formed in a portion of the first yoke member 131 that covers a side of the one end in the axial direction of the magnetizing coil 11. The fixed core 12 and the first yoke member 131 are joined by fitting a part of the fixed core 12 into an inside of the opening 133.

The second yoke member 132 is a member called a top plate, which is formed of a plate material made of a magnetic material, is connected to the first yoke member 131, and covers a side of the other end in the axial direction of the magnetizing coil 11. The second yoke member 132 is formed with a yoke hole 134 at a position corresponding to the fixed core 12 and the movable core 14. A shape of an inner circumference of the second yoke member 132 is a shape corresponding to the movable core 14.

The movable core 14 is a disk-shaped member made of a magnetic material, and is arranged so as to be relatively movable with respect to the fixed core 12 at a position corresponding to the yoke hole 134 of the second yoke member 132. A shape of an outer circumference of the movable core 14 corresponds to a shape of the inner circumference of the second yoke member 132. The movable core 14 is formed with a through hole 141 to which the shaft 15 is fixed in a penetrating state.

The shaft 15 is fixed to the movable core 14 in a state where it is inserted into the through hole 141 of the movable core 14. Further, a portion of the shaft 15 on a side to the fixed core 12 is inserted into the through hole 121 formed in the fixed core 12 in a sliding manner. Therefore, the shaft 15 can reciprocate in the axial direction integrally with the movable core 14.

Further, the shaft 15 is formed with a flange portion 151 having an enlarged outer diameter thereof. A surface of the movable core 14 on a side to the fixed core 12 comes in contact with the flange portion 151. Therefore, a misalignment between the shaft 15 and the movable core 14 is prevented.

Further, a ceramic insulator 18 is fixed to the end of the shaft 15 opposite to the fixed core 12. When the magnetizing coil 11 is not energized, the ceramic insulator 18 and the movable element 23 come into contact with each other.

Further, a spring holding portion 142 into which the return spring 16 is fitted is provided at a portion of the movable core 14 on a side to the magnetizing coil 11. The spring holding portion 142 is formed by a protrusion protruding from one surface of the movable core 14 on a side to the return spring 16 in an annular shape, and the return spring 16 is fitted on an outer peripheral surface thereof.

One end of the return spring 16 is held by a spring holding portion 142 provided on the movable core 14, and the other end is in contact with a step portion 172 provided on the bobbin 17. The return spring 16 urges the movable core 14 away from the fixed core 12.

The fixed core 12, the yoke 13, the movable core 14, and the like included in the drive unit 10 described above form a magnetic circuit in which the magnetic flux induced by the magnetizing coil 11 flows when the magnetizing coil 11 is energized.

Figure 2:
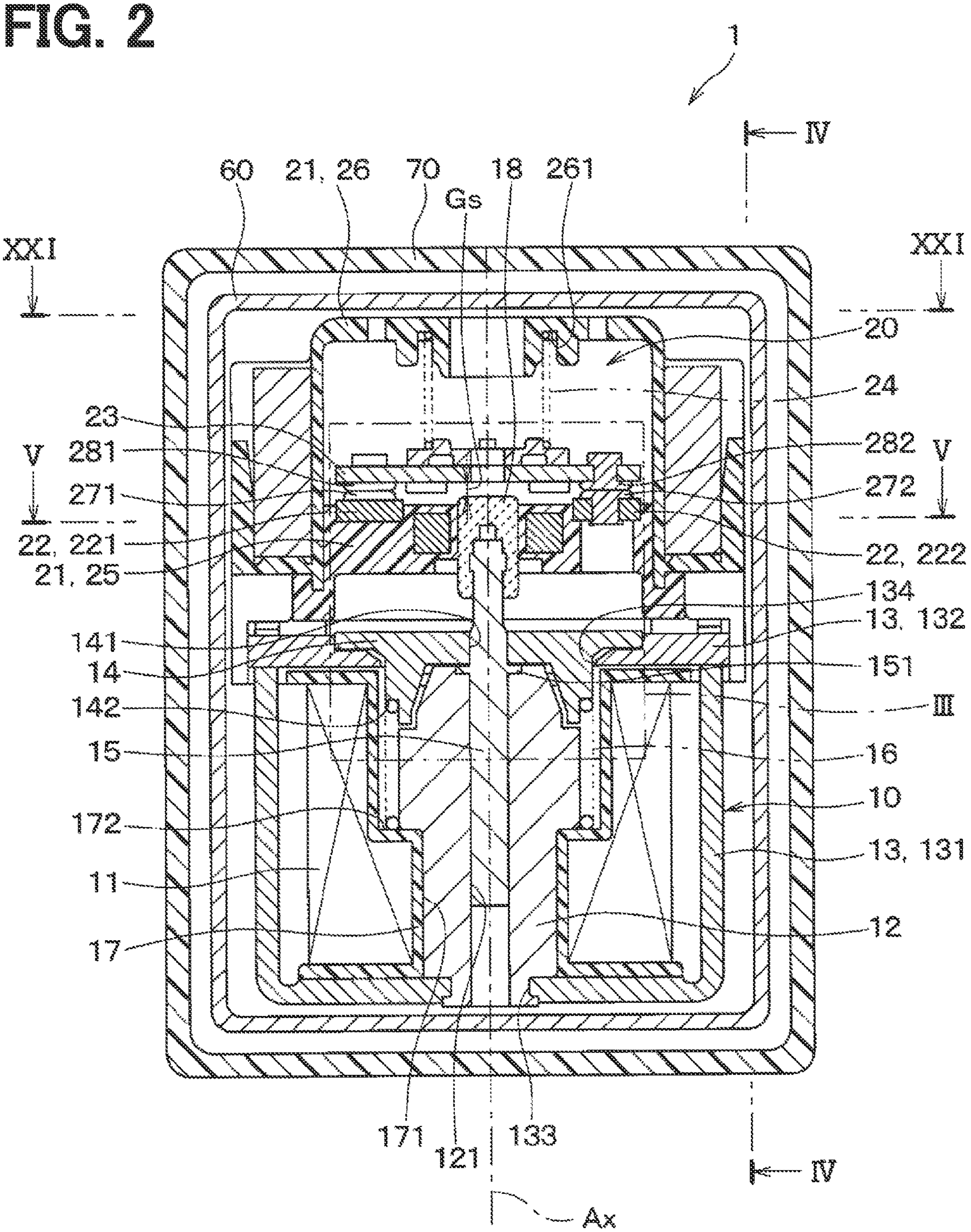
FIG. 2 is a cross-sectional view illustrating an on state of an electromagnetic relay according to a first embodiment.

As shown in FIG. 1, when the magnetizing coil 11 is not energized during a current is not supplied to the magnetizing coil 11, the movable core 14 is located away from the fixed core 12 due to an urging force of the return spring 16. On the other hand, as shown in FIG. 2, when the magnetizing coil 11 is energized, the movable core 14 is magnetically attracted to a side to the fixed core 12 against the urging force of the return spring 16, and a movable portion component comes into contact with the fixed core 12. The movable component means any of the shaft 15, the movable core 14, and a component that moves integrally with them. In the present embodiment, the flange portion 151 of the shaft 15 constituting the movable component is configured to be in contact with the fixed core 12, but the present invention is not limited to this. For example, the movable core 14 constituting the movable component may be configured to come in contact with the fixed core 12.

Next, as shown in FIGS. 1 to 4, the relay unit 20 included in the electromagnetic relay 1 includes a frame 21, a fixed terminal 22, a movable element 23, a contact pressure spring 24, and the like.

The frame 21 is made of, for example, an insulating material such as a resin material. The frame 21 is composed of a base frame 25 and an intermediate frame 26. The base frame 25 and the intermediate frame 26 are integrally fixed. The base frame 25 is provided over the relay unit 20 and the drive unit 10. The intermediate frame 26 is provided so as to cover a part of the fixed terminal 22, the movable element 23, and the contact pressure spring 24.

A first fixed terminal 221 and a second fixed terminal 222 made of a conductive metal are fixed to the base frame 25. The first fixed terminal 221 and the second fixed terminal 222 are connected to an external electric circuit, not illustrated, which is subject to be a turning on and off control by the electromagnetic relay 1. The first fixed contact 271 is attached to the first fixed terminal 221 and the second fixed contact 272 is attached to the second fixed terminal 222. The first fixed terminal 221 and the second fixed terminal 222 have a shape extending in a direction perpendicular to the paper surface of FIG. 1.

The movable element 23 is a plate-shaped member made of conductive metal, and is provided on a side opposite to the movable core 14 with respect to the fixed terminal 22. The movable element 23 is provided in a movable manner in an axial direction of the shaft 15 with respect to the fixed terminal 22. A surface of the movable element 23 on a side to the fixed core 12 can come into contact with the ceramic insulator 18 fixed to the end of the shaft 15.

A first movable contact 281 and a second movable contact 282 are fixed to the movable element 23. When the magnetizing coil 11 is energized, the first movable contact 281 is able to come into contact with the first fixed contact 271, and the second movable contact 282 is able to come into contact with the second fixed contact 272.

An annular groove 261 into which one end of the contact pressure spring 24 is fitted is formed in a central portion of the intermediate frame 26. One end of the contact pressure spring 24 is fitted into the annular groove 261 and the other end comes in contact with the movable element 23. The contact pressure spring 24 urges the movable element 23 to a side to the shaft 15 and to a side to the fixed terminal 22. Therefore, the movable core 14 is magnetically attracted to a side to the fixed core 12 when the magnetizing coil 11 is energized, the movable element 23 moves to a side to the fixed terminal 22 due to the elastic force of the contact pressure spring 24. Then, the first movable contact 281 and the first fixed contact 271 come into contact with each other, and the second movable contact 282 and the second fixed contact 272 come into contact with each other. An elastic force of the contact pressure spring 24 is set to be smaller than an elastic force of the return spring 16.

Figure 3:
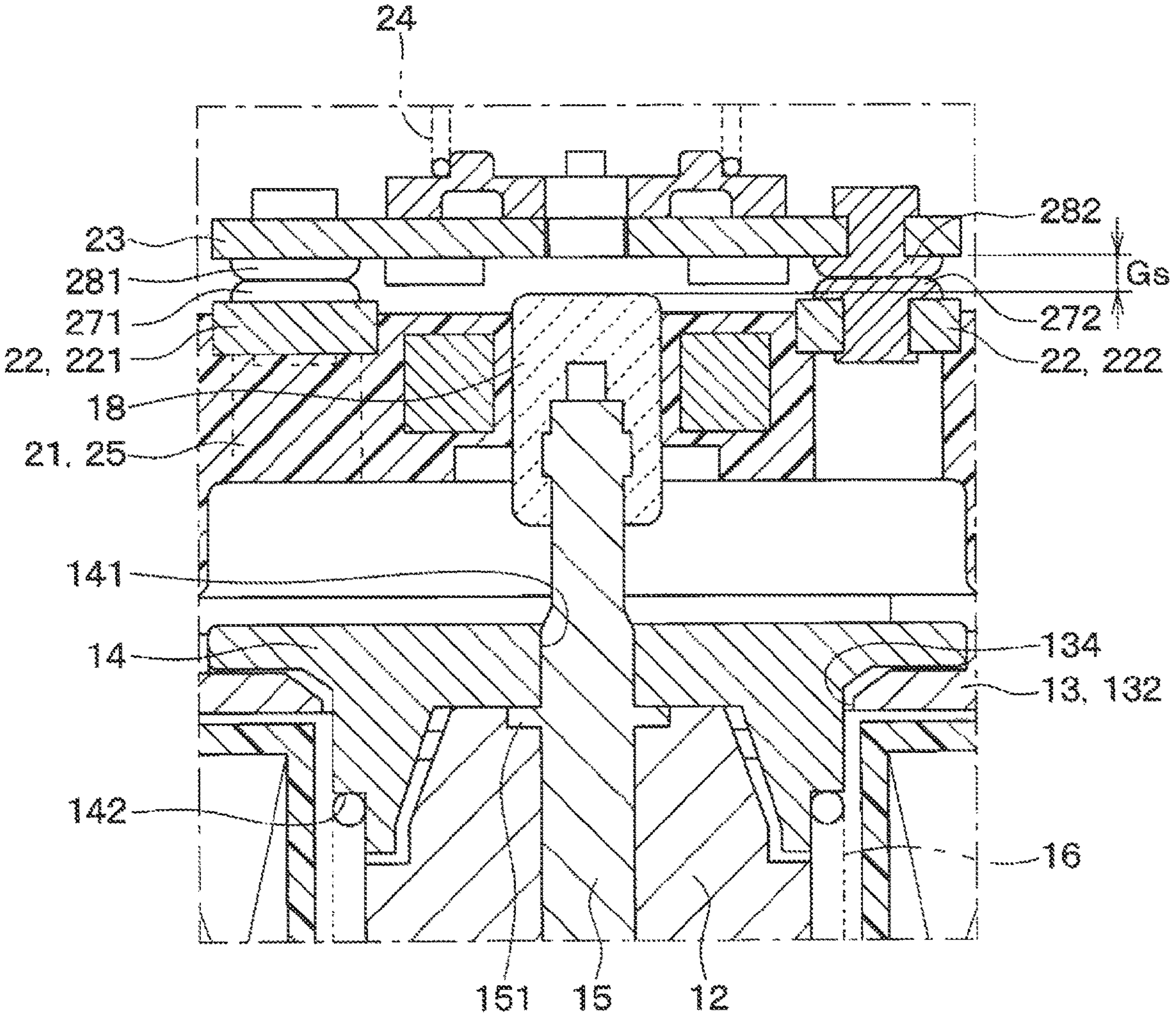
FIG. 3 is an enlarged view of a portion III of FIG. 2.

As shown in FIG. 3, the configuration of the present embodiment is a configuration in which a gap, hereinafter this may be simply referred to as a gap Gs, is formed between the ceramic insulator 18 provided at the end of the shaft 15 and the surface of the movable element 23 on a side to the shaft 11, when the magnetizing coil 11 is energized. The gap Gs formed when the magnetizing coil 11 is energized improves a current cutoff performance by increasing a separating speed of the movable contacts 281 and 282 of the movable element 23 to separate from the fixed contacts 271 and 272 of the fixed terminal 22 in response to a turning off of a current supply to the magnetizing coil 11 of the drive unit 10. The separating speed is determined by an elastic energies of the contact pressure spring 24 and the return spring 16 that come into contact with the movable contacts 281 and 282 and the movable element 23, and the elastic energies depend on a size of the gap Gs and a magnitude of spring constants. The elastic energy and the kinetic energy have the relationship of the following equation 1.

$$\frac{1}{2}\cdot k\cdot x^2=\frac{1}{2}\cdot m\cdot v^2 \quad \text{(Equation 1)}$$

In Equation 1 above, the left term represents the elastic energy and the right term represents the kinetic energy. "k" is the spring constant. "x" is a distance of the gap Gs. "v" is the separating speed.

Therefore, as described below, the present embodiment provides a configuration in which it is possible to reduce differences of the gap Gs for each product.

Figure 4:
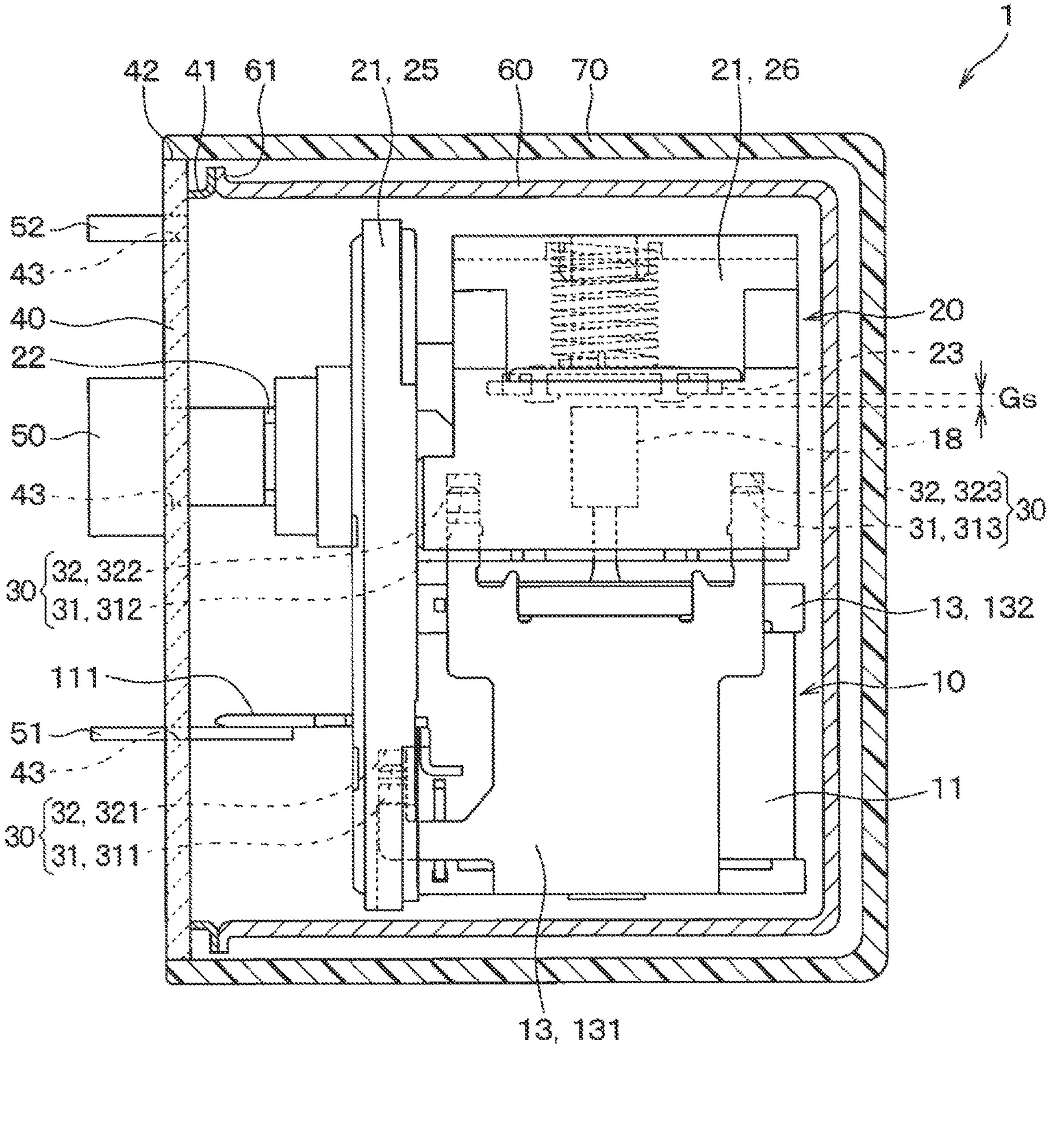
FIG. 4 is a sectional view taken along line IV-IV in FIG. 2.

As shown in FIG. 4, the press-fit fixing portion 30 is configured of a plurality of claw portions 31 provided on the yoke 13, and a plurality of recess portions 32 provided on the base frame 25 and the intermediate frame 26, respectively.

The recess portion 32 provided in the base frame 25 is called a first recess portion 321. The recess portion 32 provided on a side of the intermediate frame 26 to the base frame 25 is called a second recess portion 322. The recess portion 32 provided on the intermediate frame 26 at a position away from the base frame 25 with respect to the second recess portion 322 is referred to as a third recess portion 323. On the other hand, among the plurality of claw portions 31 provided on the yoke 13, those provided at positions corresponding to the first recess portion 321, the second recess portion 322 and the third recess portion 323 are called a first claw portion 311, a second craw portion 312, and a third claw portion 313, respectively. The first claw portion 311, the second claw portion 312, and the third claw portion 313 are fixed to the first recess portion 321, the second recess portion 322, and the third recess portion 323 by press fitting, respectively. As a result, the relay unit 20 and the drive unit 10 described above are fixed.

In a state before the sealing member 40 and the inner cover 60 are attached, it is possible to adjust the gap Gs between the end portion of the shaft 15, i.e., the ceramic insulator 18 and the movable element 23 when the claw portion 31 and the recess portion 32 are press-fitted. The gap Gs is adjusted in the same state as when the magnetizing coil 11 is energized. Specifically, when the claw portion 31 and the recess portion 32 are press-fitted, the relay unit 20 and the drive unit 10 are brought into the same state as when the magnetizing coil 11 is energized. The same state as when the magnetizing coil 11 is energized is a state in which the movable element 23 and the fixed terminal 22 included in the relay unit 20 come in contact with each other, and the movable component and the fixed core 12 included in the drive unit 10 come in contact with each other. Then, by adjusting the press-fitting amount between the claw portion 31 and the recess portion 32 in order to adjust the gap Gs into a predetermined size, it is possible to set the gap Gs into the predetermined size. For the adjustment of the gap Gs, for example, a jig or gauge, not shown, may be used, or an image taken by a camera may be used.

The sealing member 40, the external connection terminals 50, the inner cover 60, and the outer cover 70, described later, are assembled after the above-mentioned adjustment for the gap Gs are performed.

The sealing member 40 is formed in a substantially rectangular plate shape by a material having insulating properties and impermeable to arc extinguishing gas, such as ceramic. The sealing member 40 is provided on an outside of the relay unit 20 and the drive unit 10. The sealing member 40 is provided with a plurality of holes 43 through which external connection terminals 50, coil external connection terminals 51, and the gas filling pipe 52 are inserted. The external connection terminals 50, the coil external connection terminals 51, and the gas filling pipe 52 are each fixed to the sealing member 40 by brazing or the like in a state inserted through the holes 43 of the sealing member 40. The external connection terminal 50 is joined to the fixed terminal 22, and the coil external connection terminal 51 is joined to the terminal 111 of the magnetizing coil 11.

Figure 5:
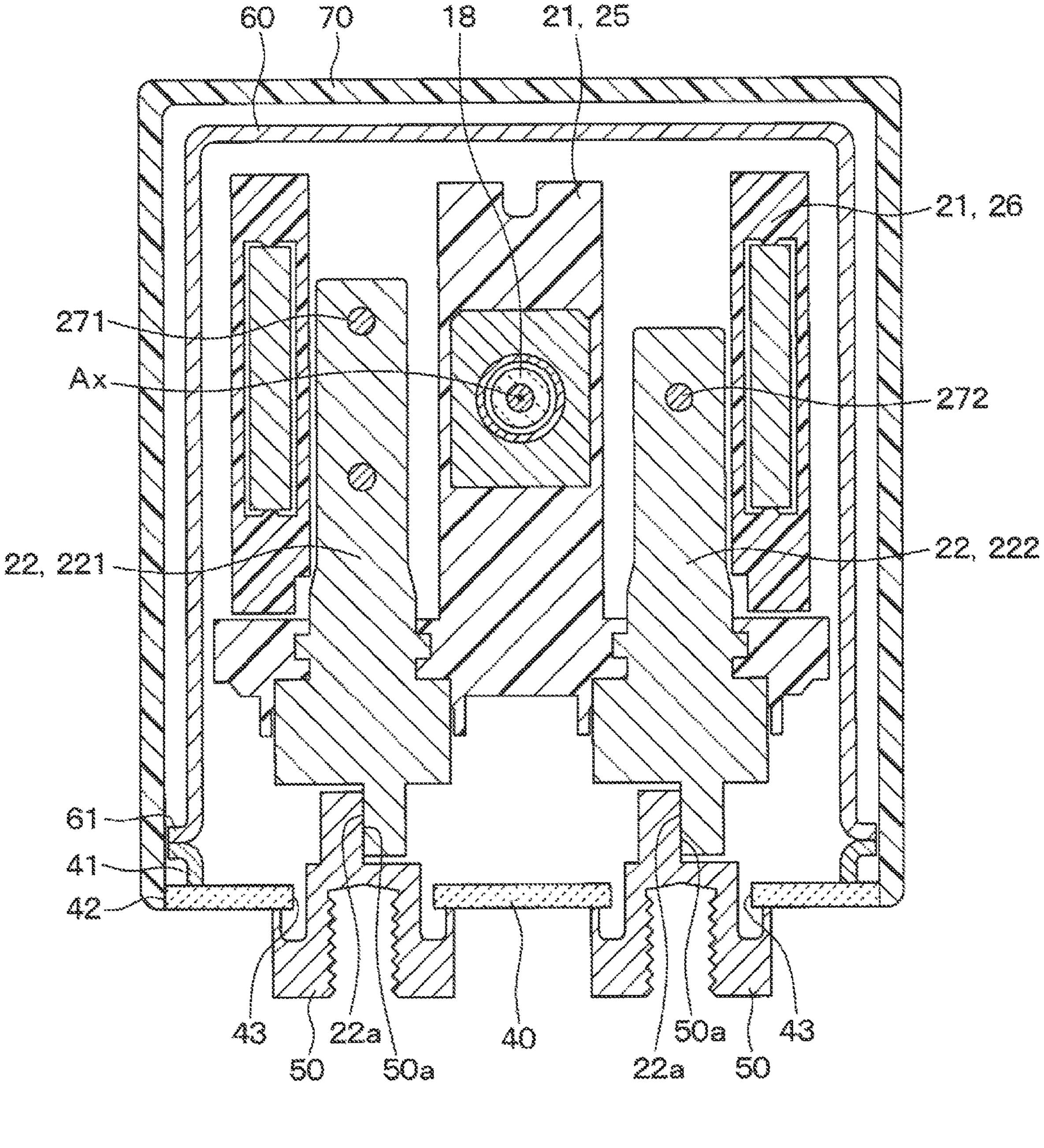
FIG. 5 is a cross-sectional view taken along a line V-V of FIG. 2.

Here, as shown in FIG. 5, joining surfaces 22*a* and 50*a* of the fixed terminals 22 and the external connection terminals 50 are formed parallel to the axis Ax of the shaft 15. The joining surfaces 22*a* and 50*a* spread parallel to the axis Ax. The fixed terminal 22 has a convex portion protruding toward the external connection terminal 50. The convex portion defines and forms the joining surface 22*a*. The external connection terminal 50 has a convex portion protruding toward the fixed terminal 22. The convex portion defines and forms the joining surface 50*a*. Thereby, when the external connection terminal 50 and the fixed terminal 22 are joined, it is possible to reduce a stress acting on the fixed terminal 22 in the axial direction of the shaft 15. Therefore, when the external connection terminal 50 and the fixed terminal 22 are joined, the fixed terminal 22 is prevented from being displaced in the axial direction of the shaft 15. Therefore, it is possible to suppress the gap Gs from changing after the gap Gs is set.

As shown in FIGS. 1 to 5, the inner cover 60 is formed in a box shape by a material such as metal that does not allow the arc-extinguishing gas to permeate. The drive unit 10 and the relay unit 20 are accommodated inside the inner cover 60. The inner cover 60 has an opening on a side where the sealing member 40 is arranged. The sealing member 40 is arranged on a side to the opening of the inner cover 60. Further, a flange 61 extending outward is provided in an opening of the inner cover 60.

A frame member 41 is provided between the sealing member 40 and the inner cover 60. The frame member 41 is formed of a material that does not allow the arc-extinguishing gas to permeate, such as metal. The frame member 41 is annularly formed so as to have substantially the same size as the opening of the inner cover 60. In the present embodiment, the frame member 41 has an L-shaped cross section. Ac entire circumference of one outer edge of the frame member 41, i.e., one distal end of the L-shape, and the sealing member 40 are joined by brazing. Further, an entire circumference of the other outer edge of the frame member 41, i.e., the other surface of the L-shape, and the flange 61 of the inner cover 60 are joined by resistance welding. Therefore, the sealing member 40 and the inner cover 60 are joined via the frame member 41 in an airtight manner. Then, the sealing member 40, the frame member 41, and the inner cover 60 form a sealed space in which the arc-extinguishing gas is sealed. The relay unit 20 and the drive unit 10 are accommodated in the closed space.

The outer cover 70 is formed in a box shape from an insulating material such as resin, and is provided so as to cover an outside of the inner cover 60. The outer cover 70 has an opening on a side where the sealing member 40 is arranged. The sealing member 40 is provided to close the opening of the outer cover 70. An outer edge portion 42 of the sealing member 40 and the inner wall of the opening of the outer cover 70 are fixed by fitting. Thus, an outer shell of the electromagnetic relay 1 is configured by the outer cover 70 and the sealing member 40.

The electromagnetic relay according to the present embodiment is configured by the structure described above. Subsequently, the operation of the electromagnetic relay 1 according to the present embodiment is described.

First, as shown in FIG. 1, when the magnetizing coil 11 is not energized during a current is not supplied to the magnetizing coil 11, the movable core 14 is located away from the fixed core 12 due to an elastic force of the return spring 16. The ceramic insulator 18, which is fixed to the end of the shaft 15 fixed to the movable core 14, and the movable element 23 are in contact with each other, and the movable element 23 is moving away from the fixed terminal 22. Therefore, the first movable contact 281 and the second movable contact 282 are held in a state where they are separated from the first fixed contact 271 and the second fixed contact 272. Therefore, the first fixed terminal 221 and the second fixed terminal 222 are electrically separated, and the electromagnetic relay 1 is turned in an off state.

Next, as shown in FIG. 2, when the electromagnetic relay 1 is turned on, the magnetizing coil 11 is energized. As a result, the magnetic flux induced by energizing the magnetizing coil 11 flows through the magnetic circuit composed of the movable core 14, the fixed core 12, the yoke 13, and the like, and the movable core 14 is magnetically attracted to a side to the fixed core 12 while resisting the elastic force of the return spring 16. Then, as the movable core 14 moves, the shaft 15 and the ceramic insulator 18 fixed to the end thereof also move to a side to the fixed core 12. Therefore, due to the elastic force of the contact pressure spring 24, the movable element 23 moves to a side to the fixed terminal 22, the first movable contact 281 and the first fixed contact 271 come into contact with each other, and the second movable contact 282 and the second fixed contact 272 come into contact with each other. Therefore, since the first fixed terminal 221 and the second fixed terminal 222 are electrically conducted through the movable element 23, the electromagnetic relay 1 is turned in an on state. As a result, an external electric circuit, not shown, to be turned on/off by the electromagnetic relay 1 is electrically turned in a conductive state. In this state, a gap Gs having a predetermined size is formed between the ceramic insulator 18 at the end of the shaft 15 and the movable element 23.

Subsequently, when the electromagnetic relay 1 is switched from the on state to the off state, the energization of the magnetizing coil 11 is cut off. As a result, the magnetic flux generated by energizing the magnetizing coil 11 disappears, and the movable core 14 moves away from the fixed core 12, i.e., to a side to the movable core 14 due to the elastic force of the return spring 16. At that time, the movable core 14, the shaft 15, and the ceramic insulator 18 collide with the movable element 23 by increasing a kinetic energy while moving the distance of the gap Gs. In this way, when an electrical connection between the first fixed terminal 221 and the second fixed terminal 222 are turned off, the electromagnetic relay 1 is turned in the off state.

Next, the manufacturing method of the electromagnetic relay 1 of the present embodiment described above is described with reference to the flowchart of FIG. 6 and the explanatory views of FIGS. 7 to 23.

Figure 6:
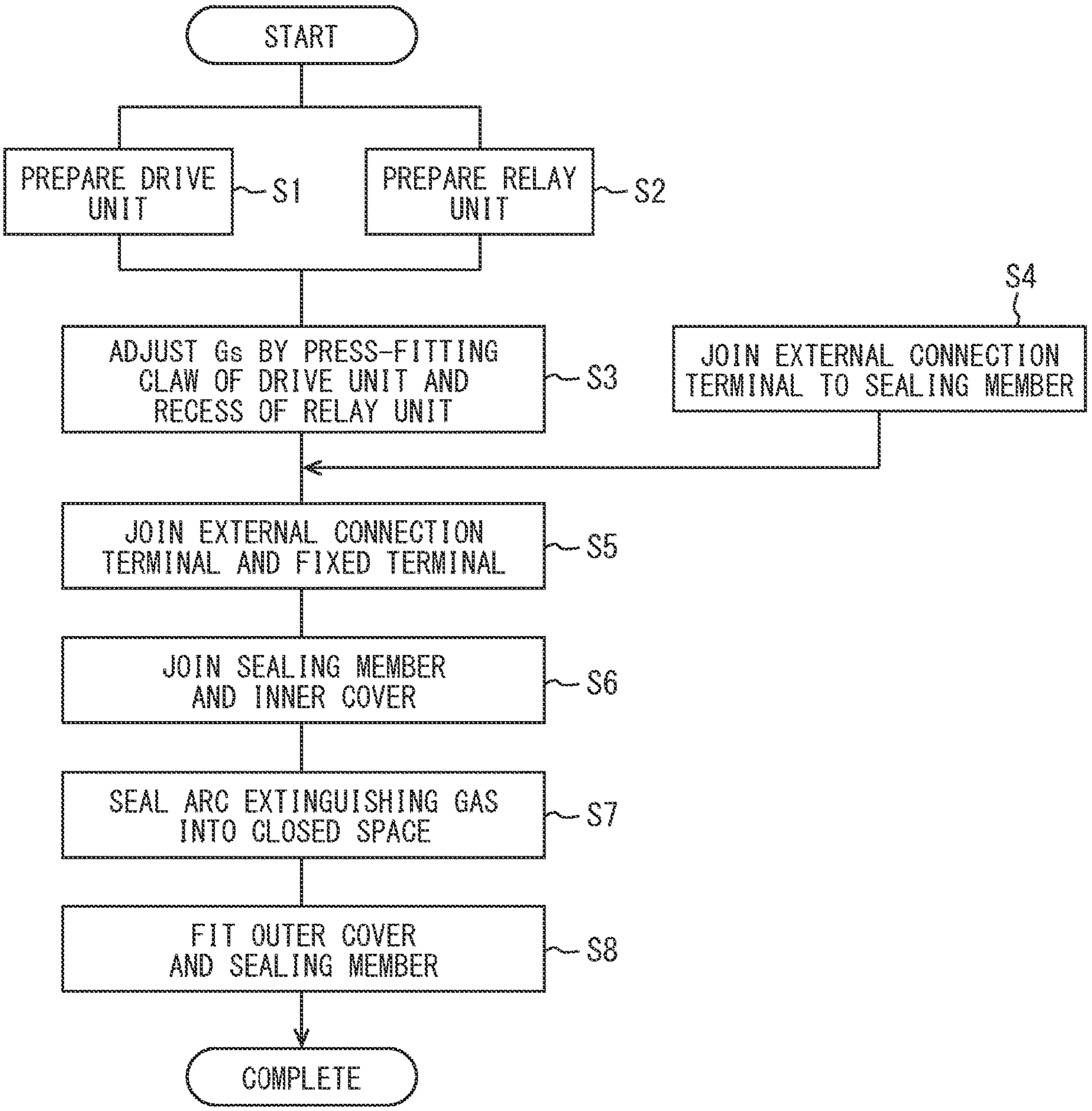
FIG. 6 is a flowchart of a method for manufacturing an electromagnetic relay according to the first embodiment.

First, a step S1 of FIG. 6 is a step of preparing the drive unit 10 in which the above-mentioned components such as the magnetizing coil 11, the fixed core 12, the yoke 13, the movable core 14, the shaft 15, and the return spring 16 are assembled.

Next, a step S2 is a step of preparing the relay unit 20 in which the components such as the frame 21, the fixed terminal 22, the movable element 23, and the contact pressure spring 24 are assembled.

Figure 7:
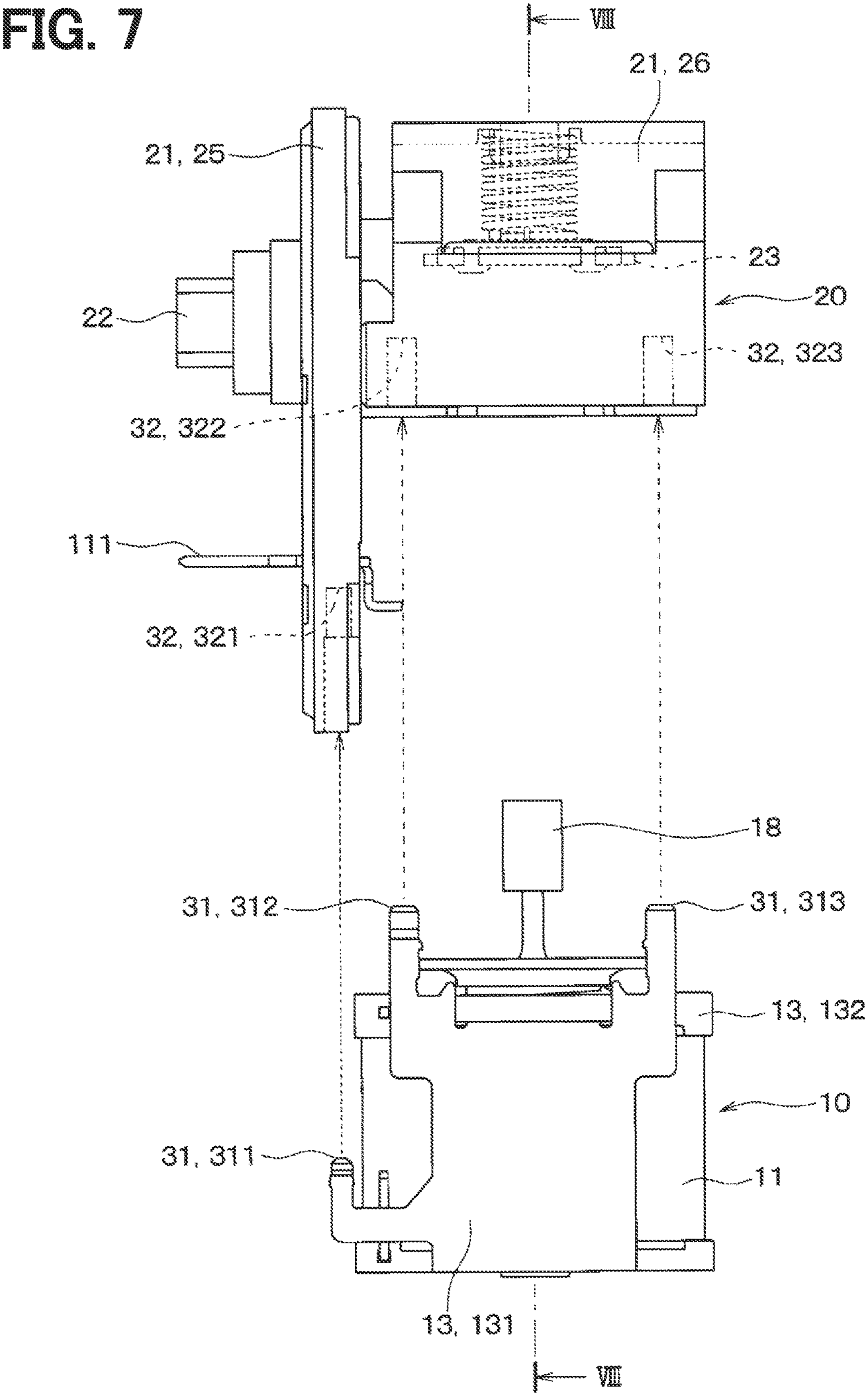
FIG. 7 is a diagram illustrating a state of fixing a drive unit and a relay unit by press fitting.
Figure 8:
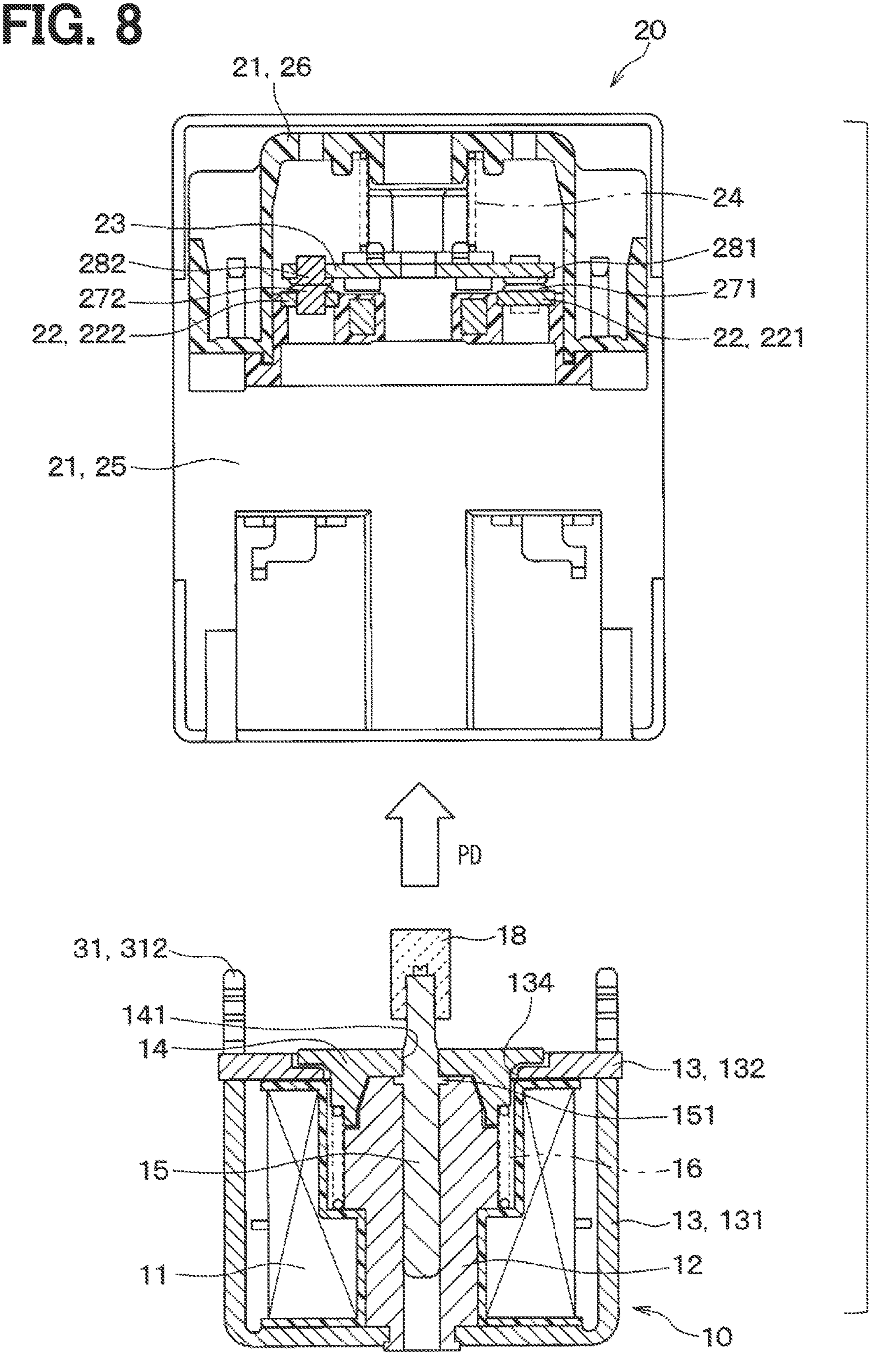
FIG. 8 is a cross-sectional view taken along a line VIII-VIII in FIG. 7.
Figure 9:
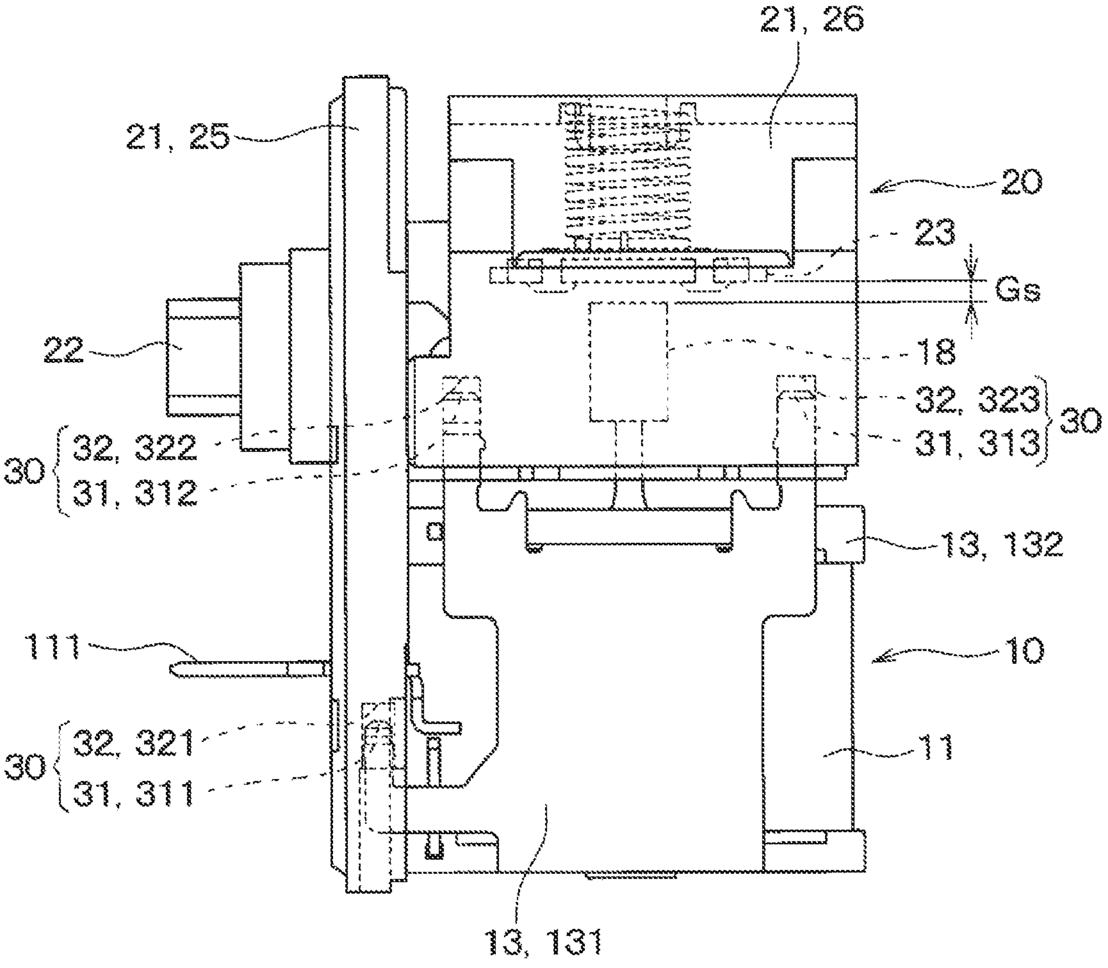
FIG. 9 is a diagram illustrating a state in which the drive unit and the power relay unit are fixed by press-fitting.

Subsequently, a step S3 is a step of fixing the relay unit 20 and the drive unit 10, and setting the gap Gs between the ceramic insulator 18 at the end of the shaft 15 and the movable element 23. Specifically, as shown in FIG. 7, the method of fixing the relay unit 20 and the drive unit 10 press-fits and fixes the first claw portion 311, the second claw portion 312, and the third claw portion 313 provided on the yoke 13 of the drive unit 10 into the first recess portion 321, the second recess portion 322, and the third recess portion 323 provided in the frame 21 of the relay unit 20, respectively. At that time, as shown in FIG. 8, both the relay unit 20 and the drive unit 10 are brought into the same state as when it is energized. Specifically, the relay unit 20 is brought into a state where the contacts of the movable element 23 and the fixed terminal 22 are in contact with each other. Further, the drive unit 10 is brought into a state where the movable component and the fixed core 12 are in contact with each other. The arrow symbol PD indicates the insertion direction in the press-fitting process. In this state, as shown in FIG. 9, a press-fitting amount between the claw portion 31 and the recess portion 32 is adjusted so that the gap Gs has a predetermined size. As a result, the relay unit 20 and the drive unit 10 are fixed in a state where the gap Gs is set to the predetermined size. That is, it is possible to absorb error differences in the dimensions and assembly works of components configuring the relay unit 20 and the drive unit 10 by directly adjusting the gap Gs to the target value by adjusting the press-fitting amount between the claw portion 31 and the recess portion 32.

Figure 10:
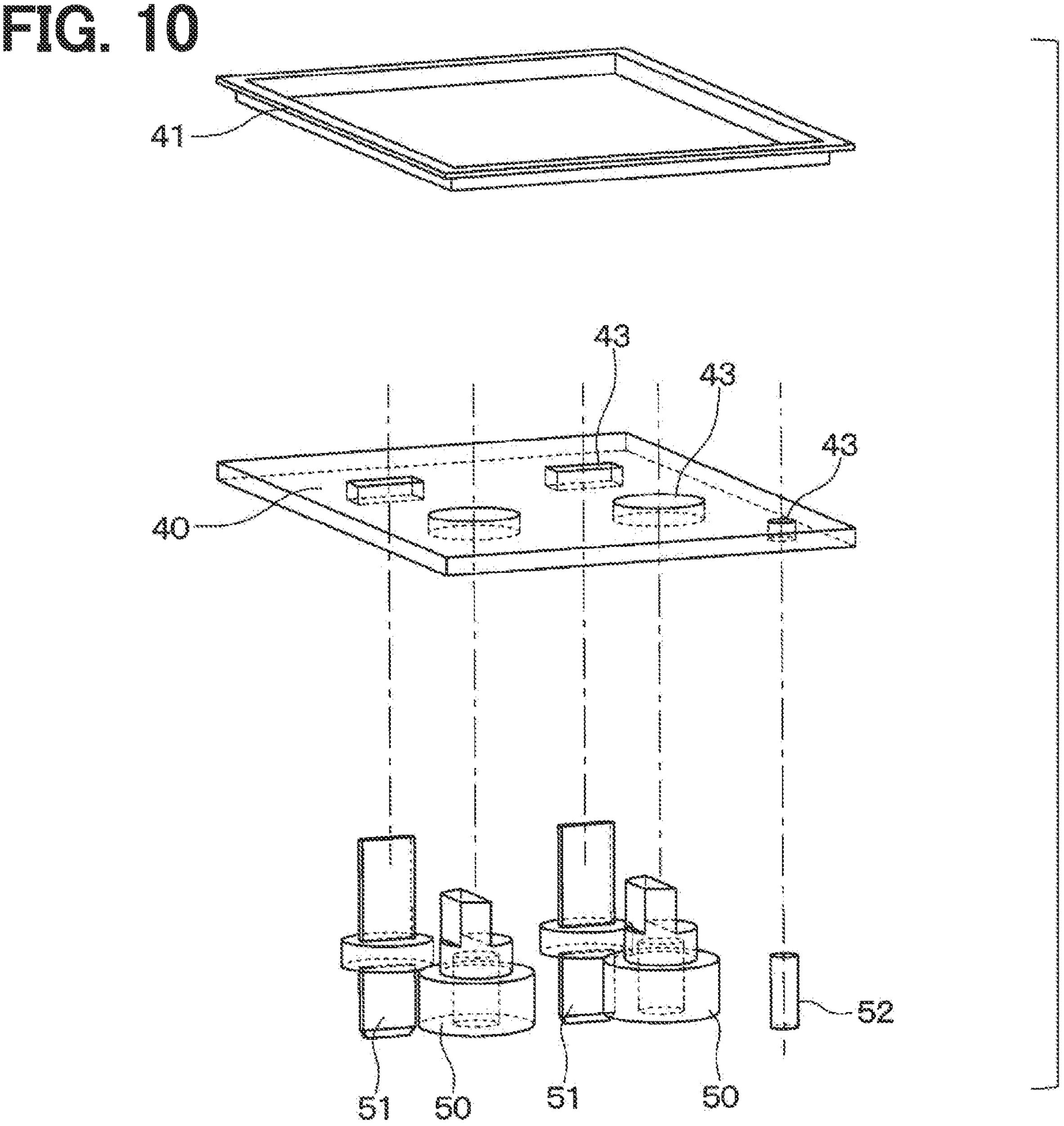
FIG. 10 is a diagram illustrating a state of joining a sealing member, an external connection terminal, a gas filling pipe, and a frame member.
Figure 11:
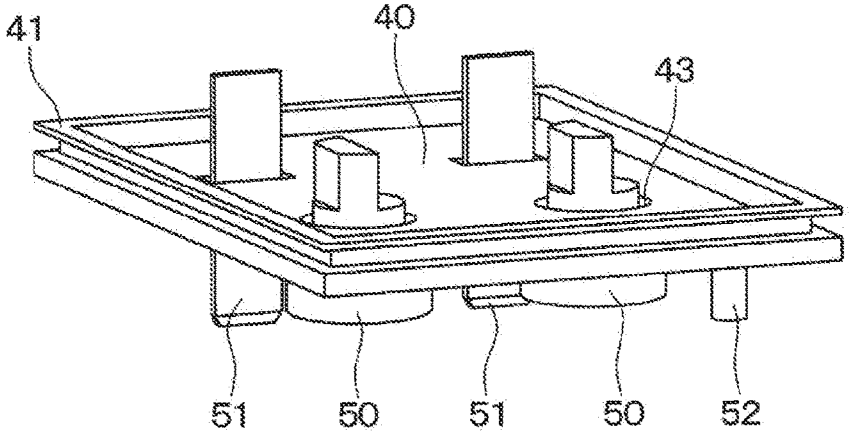
FIG. 11 is a diagram illustrating a state in which the sealing member, the external connection terminal, the gas filling pipe, and the frame member are joined.

Next, a step S4 of FIG. 6 is a step of fixing the external connection terminal 50 and the like to the sealing member 40. Specifically, as shown in FIGS. 10 and 11, the external connection terminals 50, the coil external connection terminals 51, and the gas filling pipe 52 are inserted through the plurality of holes 43 of the sealing member 40, respectively, and fixed with no gap by brazing. Further, the entire circumference of one outer edge (one tip of the L-shape) of the frame member 41 is joined to the sealing member 40 by brazing or the like so as not to have a gap. As a result, as shown in FIG. 11, the external connection terminals 50, the coil external connection terminals 51, the gas filling pipe 52, and the frame member 41 are fixed to the sealing member 40.

Figure 12:
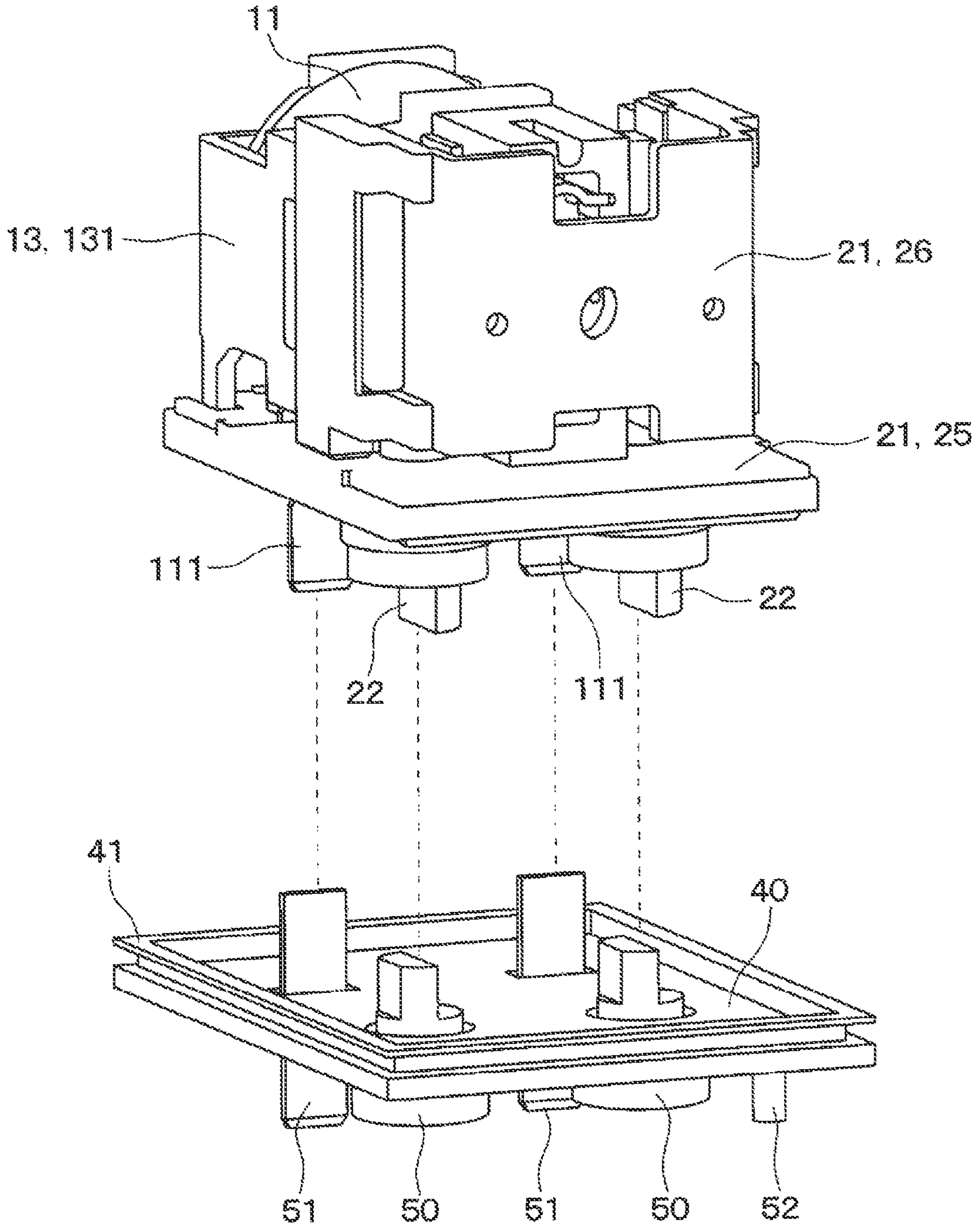
FIG. 12 is a diagram illustrating a state of joining a fixed terminal and an external connection terminal.
Figure 13:
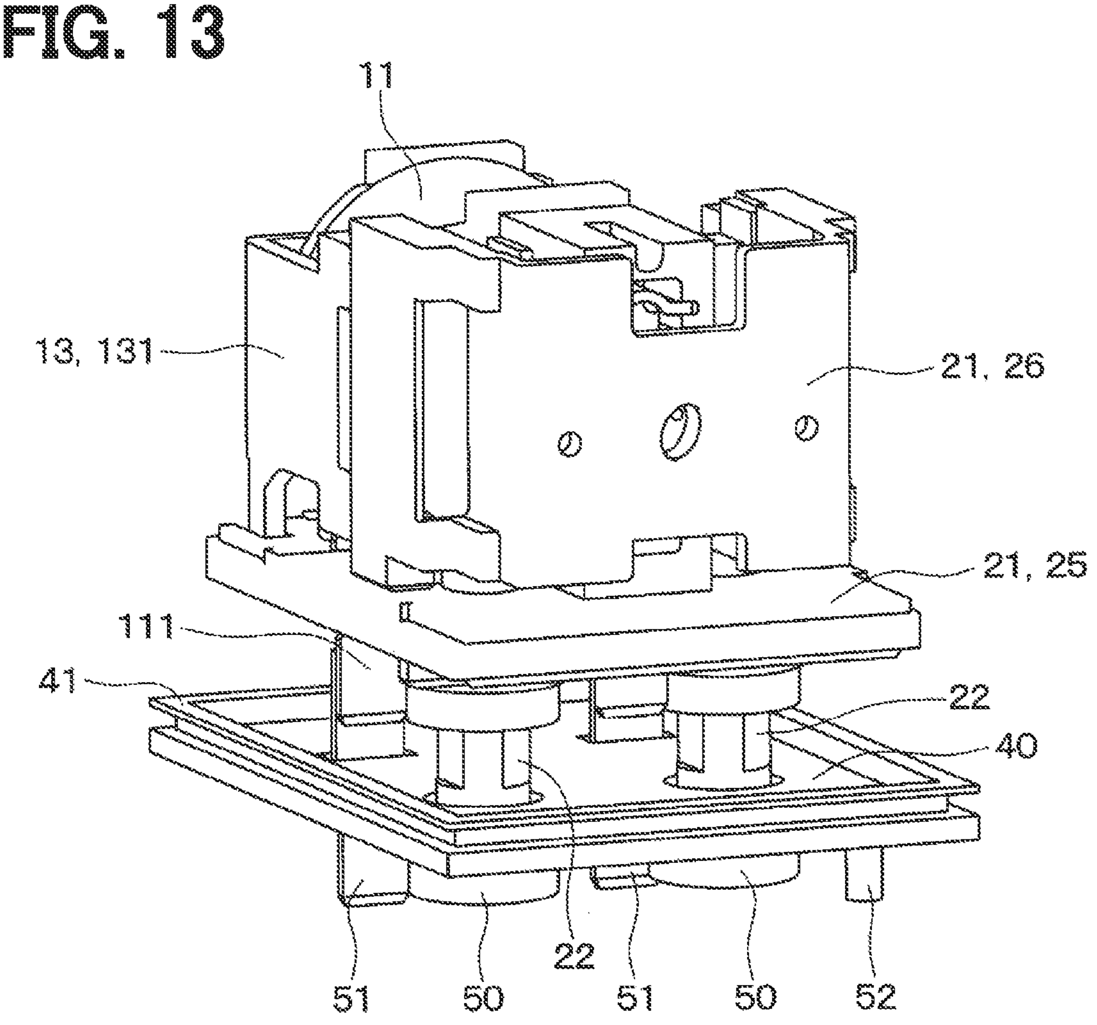
FIG. 13 is a perspective view illustrating a state in which the fixed terminal and the external connection terminal are joined.

Subsequently, a step S5 of FIG. 6 is a step of joining the external connection terminal 50 and the fixed terminal 22. Specifically, as shown in FIGS. 12 and 13, the sealing member 40 is arranged outside the relay unit 20 and the drive unit 10, and the external connection terminal 50 and the fixed terminal 22 are joined. Further, the coil external connection terminal 51 and the terminal 111 of the magnetizing coil 11 are joined.

Here, an example of a plurality of joining methods are described with respect to the joining method between the external connection terminal 50 and the fixed terminal 22.

Figure 14:
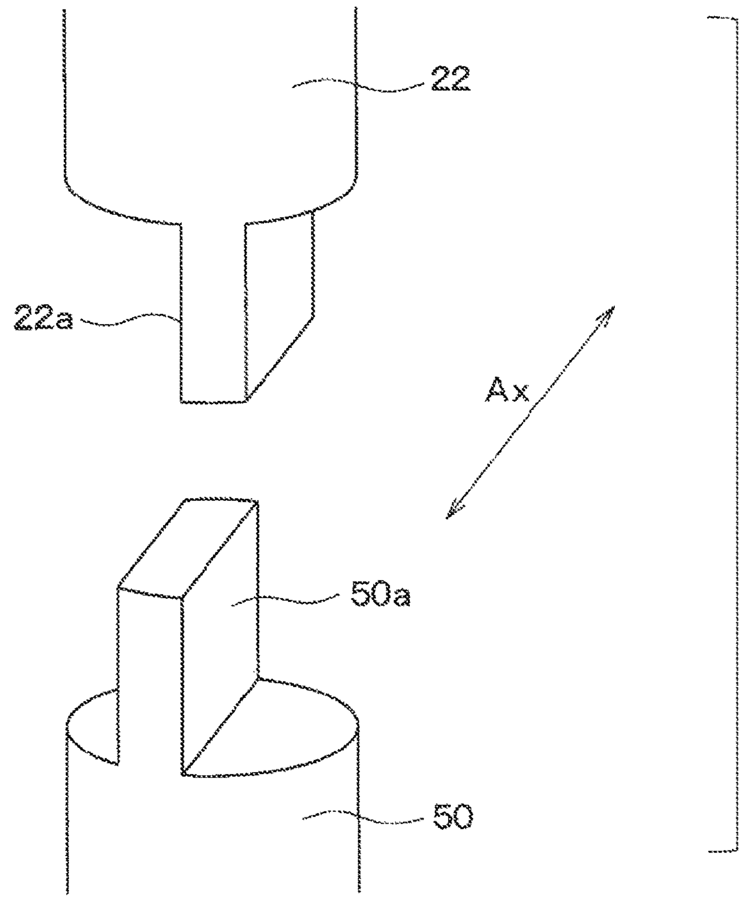
FIG. 14 is an explanatory diagram of a first example of a joining method for an external connection terminal and a fixed terminal.
Figure 15:
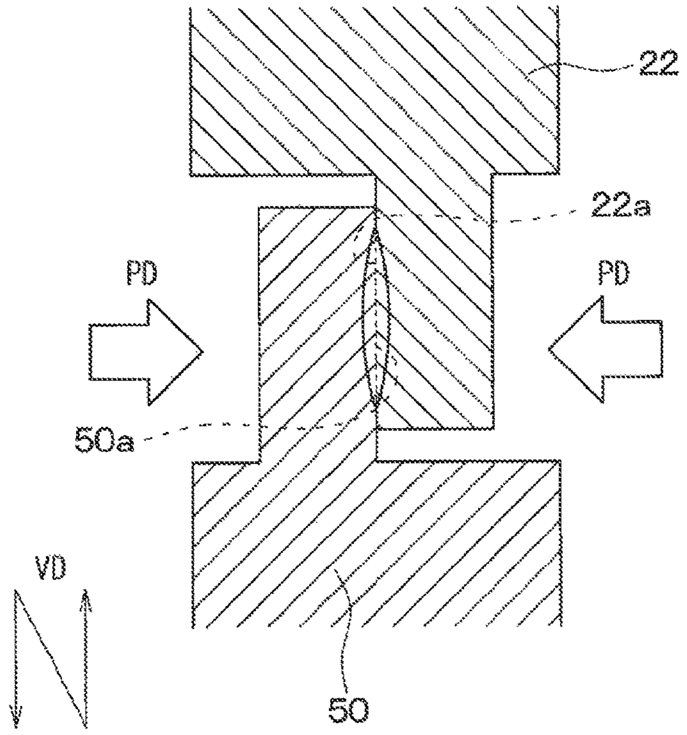
FIG. 15 is an explanatory diagram of the first example of the joining method for the external connection terminal and the fixed terminal.

FIGS. 14 and 15 show a first example of the joining method of the external connection terminal 50 and the fixed terminal 22. In FIG. 14, the axial direction of the shaft 15 is indicated by an arrow symbol Ax.

In this first example, the joining surface 50*a* provided at the end of the external connection terminal 50 and the joining surface 22*a* provided at the end of the fixed terminal 22 are brought into contact with each other, and the joint surfaces are joined by ultrasonic welding while being pressed against each other. The arrow symbol PD indicates the pressurizing direction in the pressurizing step. The arrow symbol VD indicates the vibration direction in the ultrasonic wave applying step. At that time, both the joining surface 50*a* of the external connection terminal 50 and the joining surface 22*a* of the fixed terminal 22 are formed parallel to the axis Ax of the shaft 15. Therefore, when the external connection terminal 50 and the fixed terminal 22 are joined, the stress acting on the fixed terminal 22 in the axial direction of the shaft 15 is reduced, and the displacement of the fixed terminal 22 in the axial direction of the shaft 15 is suppressed. Therefore, it is possible to suppress change of the gap Gs.

Figure 16:
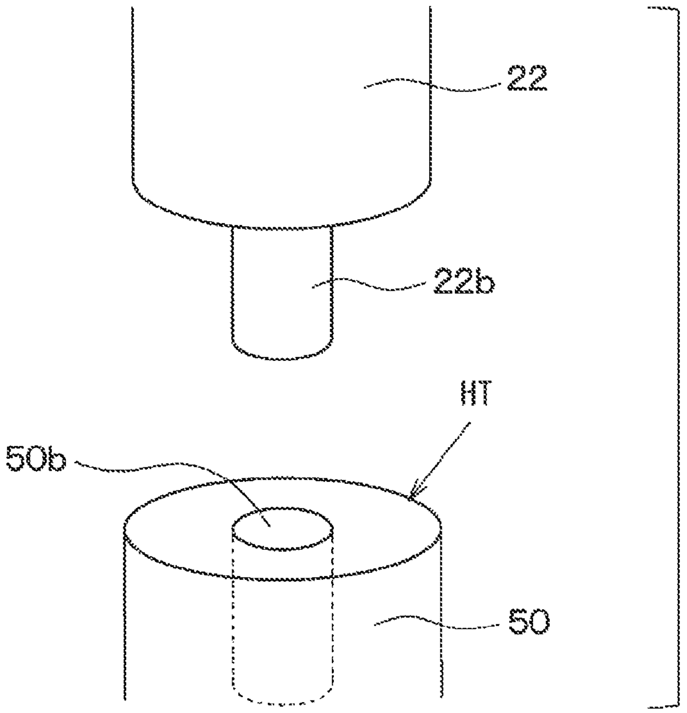
FIG. 16 is an explanatory diagram of a second example of a joining method for an external connection terminal and a fixed terminal.
Figure 17:
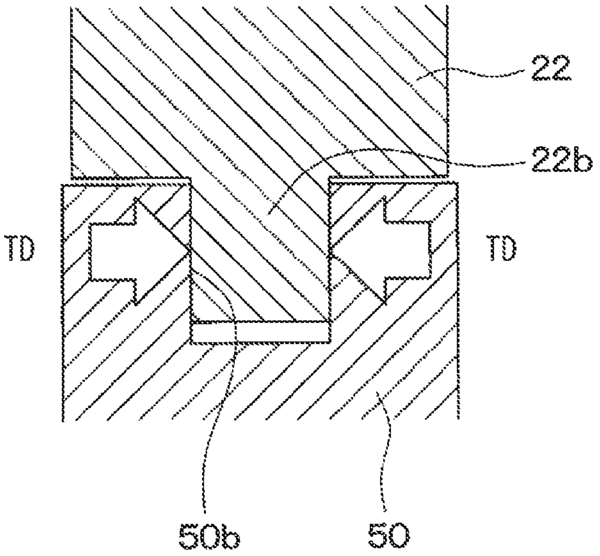
FIG. 17 is an explanatory diagram of the second example of the joining method for the external connection terminal and the fixed terminal.

FIGS. 16 and 17 show a second example of the joining method of the external connection terminal 50 and the fixed terminal 22.

In this second example, a hole 50*b* is provided at the end of the external connection terminal 50, and a dowel 22*b* is provided at the end of the fixed terminal 22. Then, after heating the end of the external connection terminal 50 to widen the hole 50*b*, the dowel 22*b* of the fixed terminal 22 is inserted into the hole 50*b*. The arrow HT in FIG. 16 indicates a heating step for widening the hole 50*b*. Then, the end portion of the external connection terminal 50 is cooled, and the external connection terminal 50 and the fixed terminal 22 are joined by the compressive stress thereof. Therefore, the joining method of the second example is a method in which a thermal stress or a mechanical stress acting on the fixed terminal 22 is smaller than a thermal stress or a mechanical stress acting on the external connection terminal 50. Therefore, when the external connection terminal 50 and the fixed terminal 22 are joined, the stress acting on the fixed terminal 22 in the axial direction of the shaft 15 is reduced, and the displacement of the fixed terminal 22 in the axial direction of the shaft 15 is suppressed. The arrow symbol TD in FIG. 17 indicates the compression direction in which the dowel 22*b* is tightened. Therefore, it is possible to suppress change of the gap Gs.

Figure 18:
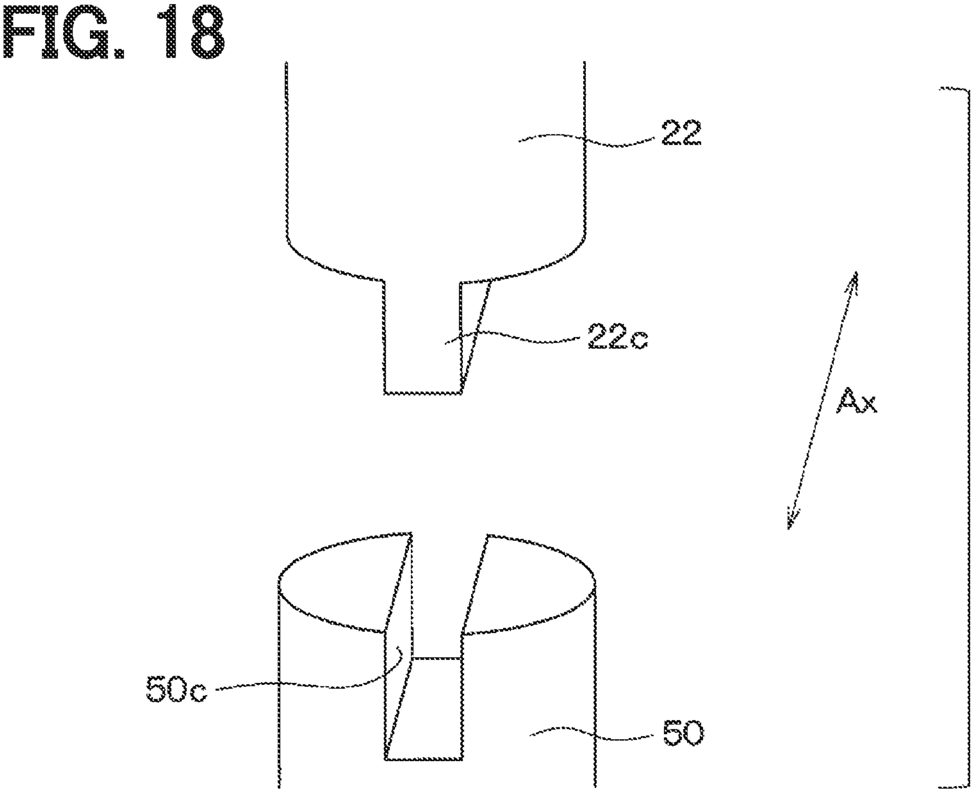
FIG. 18 is an explanatory diagram of a third example of a joining method for an external connection terminal and a fixed terminal.
Figure 19:
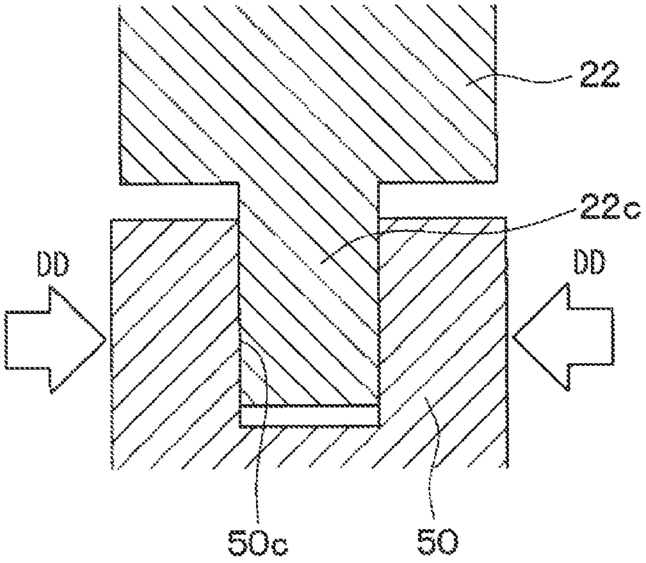
FIG. 19 is an explanatory diagram of the third example of the joining method for the external connection terminal and the fixed terminal.

FIGS. 18 and 19 show a third example of the joining method of the external connection terminal 50 and the fixed terminal 22. In FIG. 18, the axial direction of the shaft 15 is indicated by an arrow symbol Ax.

In this third example, a groove 50*c* is provided at the end of the external connection terminal 50, and a protrusion 22*b* is provided at the end of the fixed terminal 22. Then, after inserting the protrusion 22*c* of the fixed terminal 22 into the groove 50*c* of the external connection terminal 50, the external connection terminal 50 and the fixed terminal 22 are joined by applying caulking process from both sides of the external connection terminal 50. In the joining method of the third example, both the groove 50*c* of the external connection terminal 50 and the protrusion 22*c* of the fixed terminal 22 are formed parallel to the axis Ax of the shaft 15. The groove 50*c* defines and forms the joining surface 50*a*. The protrusion 22*c* defines and forms the joining surface 22*a*. Therefore, when the external connection terminal 50 and the fixed terminal 22 are joined, the stress acting on the fixed terminal 22 in the axial direction of the shaft 15 is reduced, and the displacement of the fixed terminal 22 in the axial direction of the shaft 15 is suppressed. The arrow symbol DD in FIG. 19 indicates the direction of plastic deformation that tightens the protrusion 22*c*. Therefore, it is possible to suppress change of the gap Gs.

Figure 20:
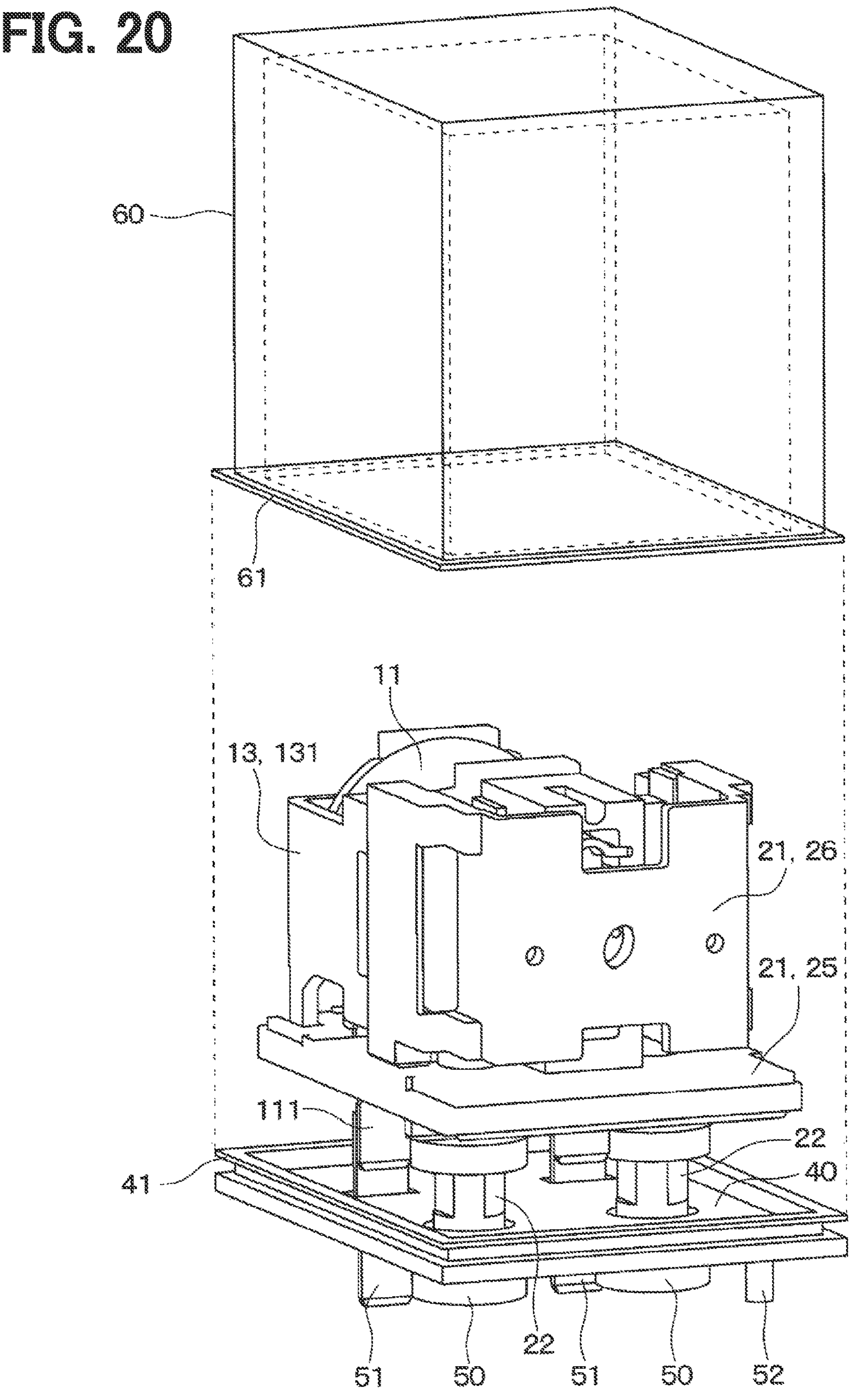
FIG. 20 is a diagram illustrating a state of joining a sealing member and an inner cover.
Figure 21:
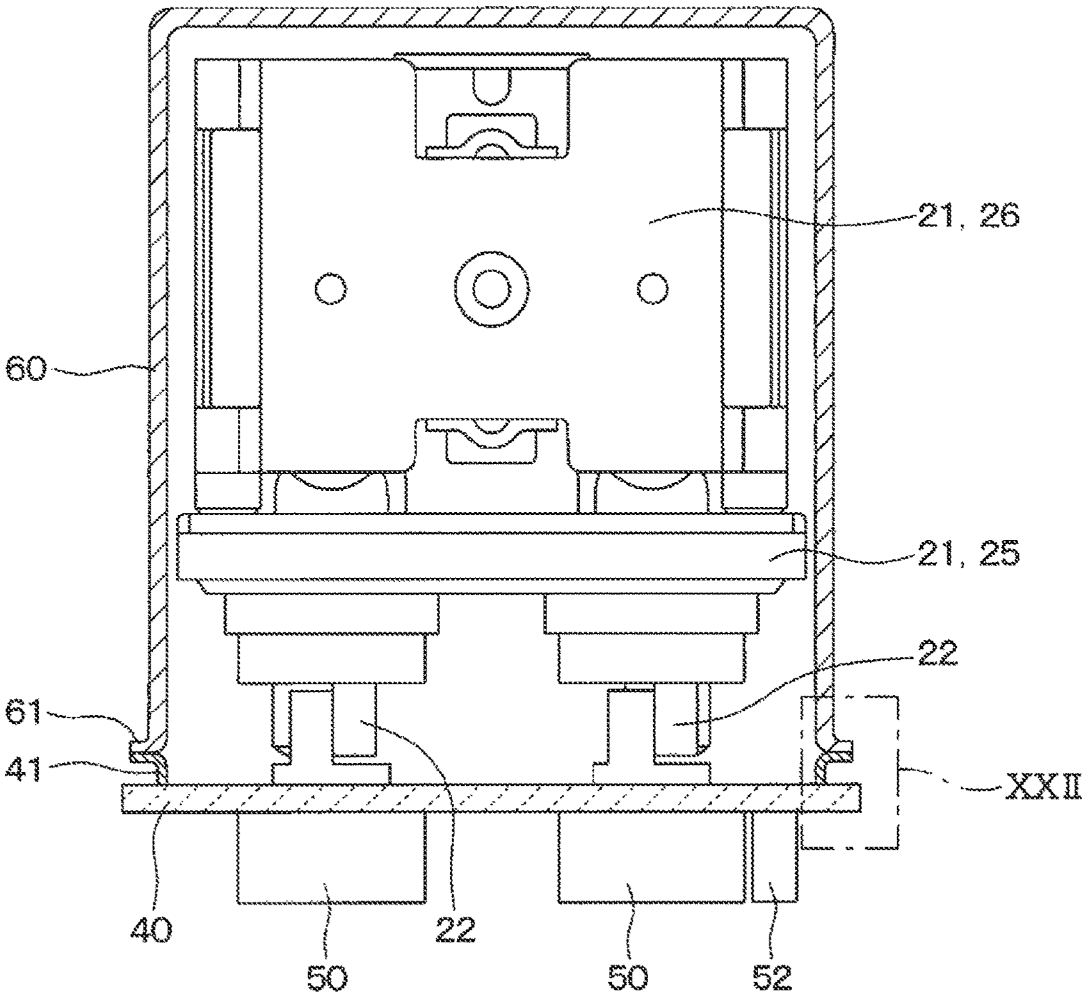
FIG. 21 is a cross-sectional view illustrating a state in which the outer cover is removed in a cross-sectional view on the XXI-XXI line of FIG. 2.
Figure 22:
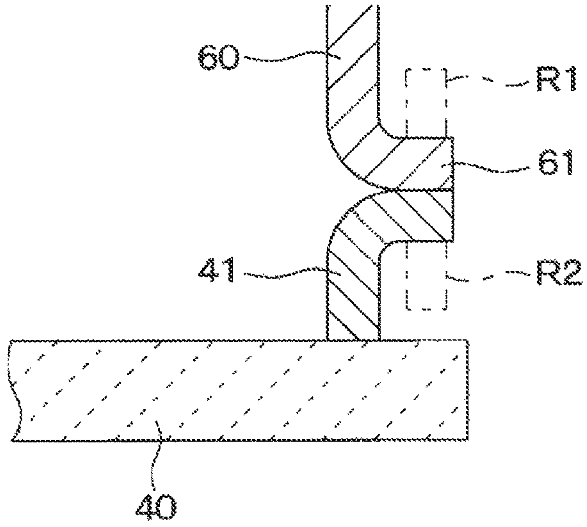
FIG. 22 is an explanatory view illustrating a welding method between the frame member and the inner cover in the enlarged view of the XXII portion of FIG. 21.

Subsequently, a step S6 of FIG. 6 is a step of joining the sealing member 40 and the inner cover 60. In the present embodiment, since the sealing member 40 is provided with the frame member 41, the frame member 41 and the inner cover 60 are joined to each other. Specifically, as shown in FIGS. 20, 21, and 22, the L-shaped surface of the frame member 41 and the flange 61 of the inner cover 60 are joined by, for example, seam welding. In FIG. 22, an example of a roller electrode used for seam welding is shown by alternate long and short dash lines R1 and R2. As a result, the L-shaped surface of the frame member 41 and the flange 61 of the inner cover 60 are welded and joined over the entire circumference, and the sealed space is formed between the inner cover 60 and the sealing member 40.

Next, a step S7 of FIG. 6 is a step of sealing the arc extinguishing gas in the closed space. For example, hydrogen is used as the arc extinguishing gas. However, the arc extinguishing gas is not limited to this, and may be any gas for extinguishing the arc. The arc extinguishing gas is filled in the closed space through the gas filling pipe 52 provided in the sealing member 40. After filling the closed space with the arc extinguishing gas, the gas filling pipe 52 is crushed or the like to close the closed space. This prevents the arc extinguishing gas from leaking from the closed space.

Figure 23:
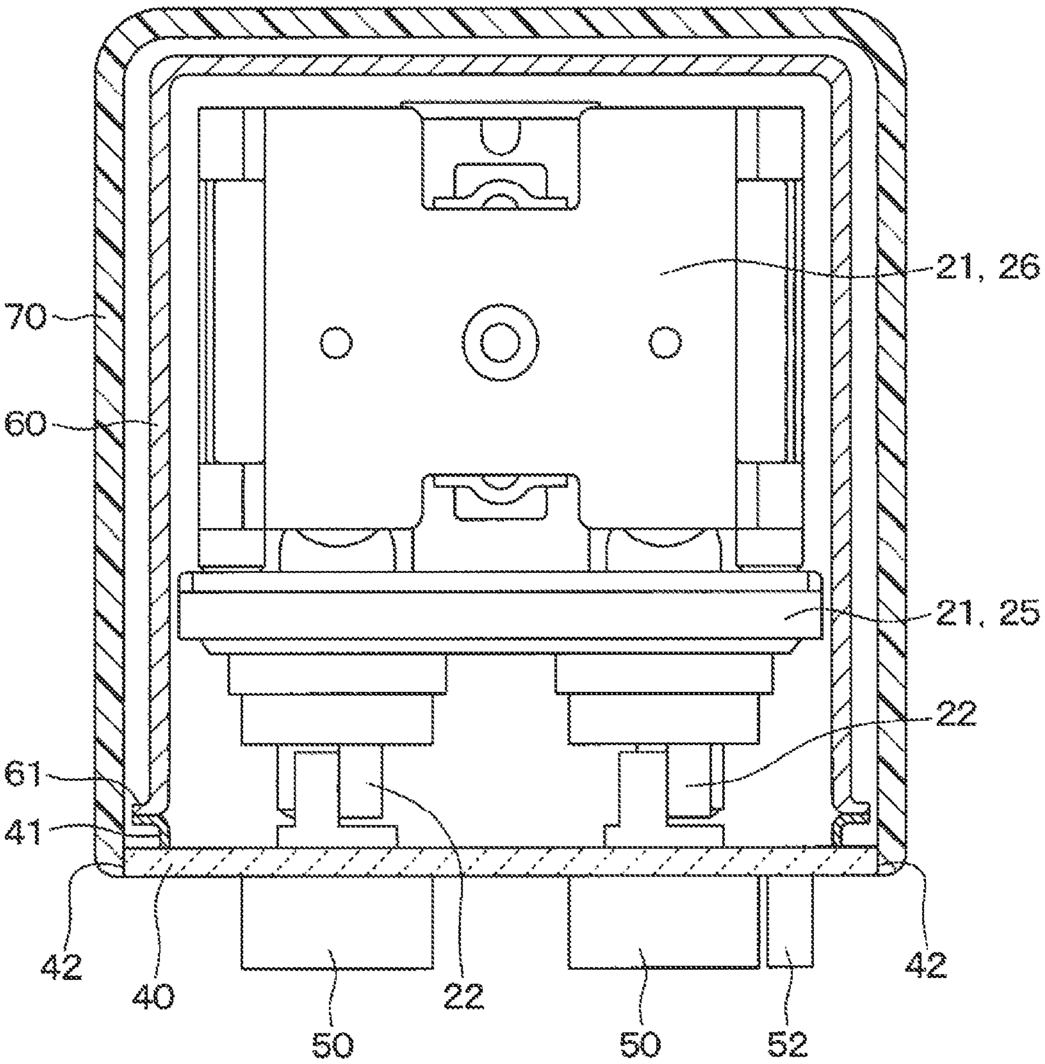
FIG. 23 is a sectional view taken along line XXI-XXI of FIG. 2.

Subsequently, a step S8 of FIG. 6 is a step of fixing the sealing member 40 and the outer cover 70. Specifically, as shown in FIG. 23, the inner wall of the opening of the outer cover 70 and the outer edge portion 42 of the sealing member 40 are fixed by fitting. As a result, the electromagnetic relay 1 is completed.

Here, in order to compare with the electromagnetic relay 1 of the present embodiment described above, the electromagnetic relay 100 of a comparative example is described with reference to FIGS. 24 and 25.

In the electromagnetic relay 100 of the comparative example, the movable core 14 of the drive unit 10 is arranged on a side opposite to the relay unit 20 with respect to the fixed core 12. The return spring 16 is provided between the movable core 14 and the fixed core 12. The movable core 14, the fixed core 12, and the return spring 16 are accommodated inside the bottomed cylindrical portion 101 provided in the central hole of the magnetizing coil 11. A screw mechanism 102 is provided on the inner wall of the central hole of the movable core 14 and the outer wall of the shaft 15. The shaft 15 and movable core 14 are fixed by a screw mechanism 102.

A plate-shaped first joining member 103 is provided on a side of the magnetizing coil 11 to the relay unit 20. A second joining member 104 in a cylindrical shape is provided on a surface of the first joining member 103 opposite to the magnetizing coil 11. A sealing container 105 in a bottomed cylindrical shape is provided at a portion of the second joint member 104 opposite to the first joint member 103. The bottomed cylindrical portion 101, the first joining member 103, the second joining member 104, and the sealing container 105 are airtightly joined, and a closed space in which the arc-extinguishing gas is sealed is formed therein.

Both the first fixed terminal 221 and the second fixed terminal 222 are placed through the inside and the outside of the sealing container 105 and fixed to the sealing container 105. A movable element 23 is arranged on a side to the magnetizing coil 11 with respect to the first fixed terminal 221 and the second fixed terminal 222. The movable element 23 has an insertion hole 231 in a central portion. The shaft 15 is inserted in the insertion hole 231 of the movable element 23. Further, a spring support portion 153 is provided on the shaft 15 between the movable element 23 and the fixed core 12. One end of the contact pressure spring 24 is in contact with the movable element 23, the other end is in contact with the spring support portion 153, and urges the movable element 23 toward a side to a tip end of the shaft 15. An elastic force of the contact pressure spring 24 is set to be smaller than an elastic force of the return spring 16.

Figure 24:
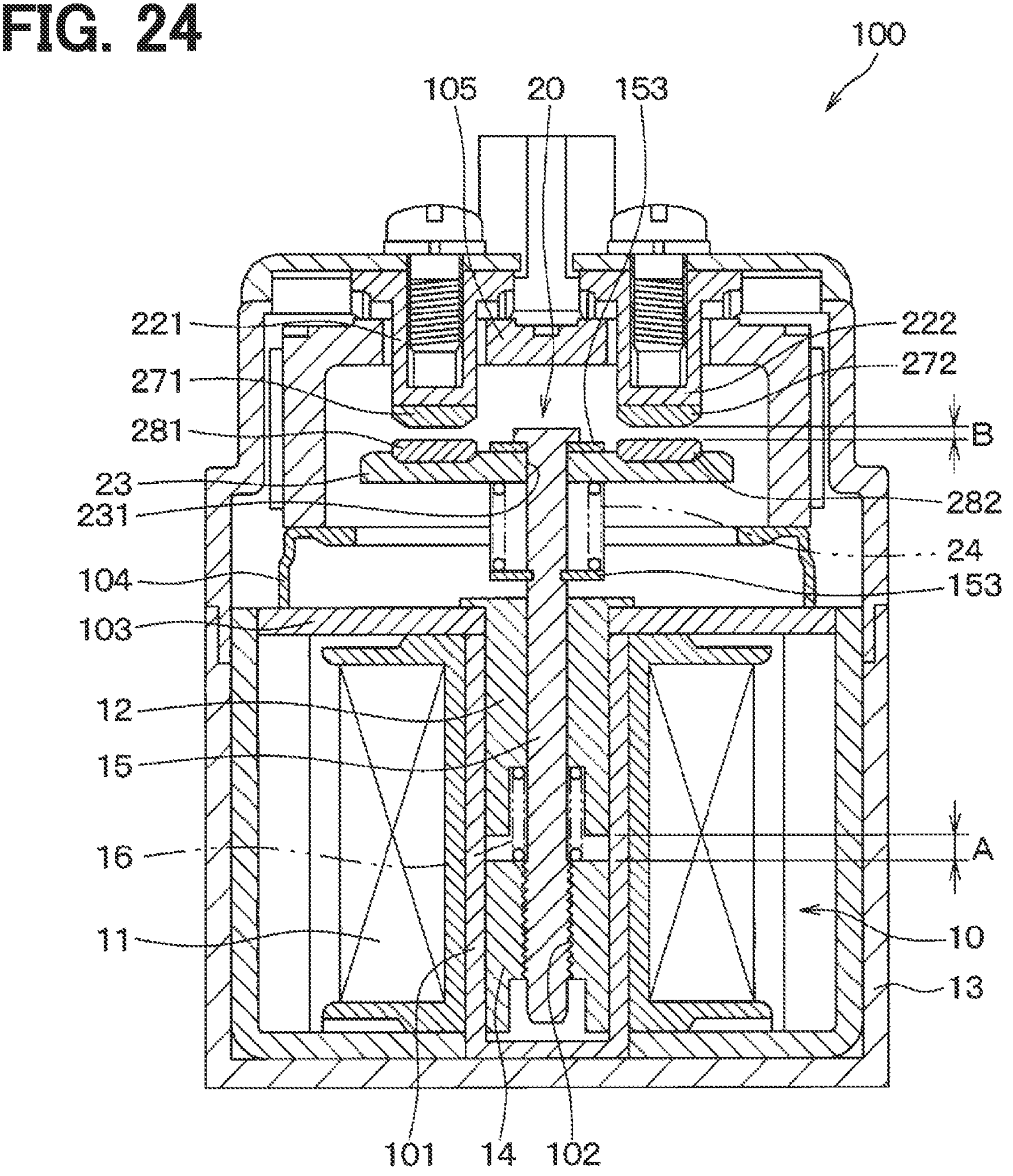
FIG. 24 is a cross-sectional view illustrating an off state of an electromagnetic relay of a comparative example.

As shown in FIG. 24, when the magnetizing coil 11 is not energized during a current is not supplied to, the movable core 14 is located away from the fixed core 12 due to an urging force of the return spring 16. Therefore, the movable element 23 is abutted and supported by the tip end portion of the shaft 15, and is moved to a position away from the fixed terminal 22. Therefore, the first fixed terminal 221 and the second fixed terminal 222 are electrically separated, and the electromagnetic relay 100 is in the off state. In this state, the distance between the fixed core 12 and the movable core 14 is assumed “A”, and the distance between the movable contacts 281 and 282 and the fixed contacts 271 and 272 is assumed “B”.

Figure 25:
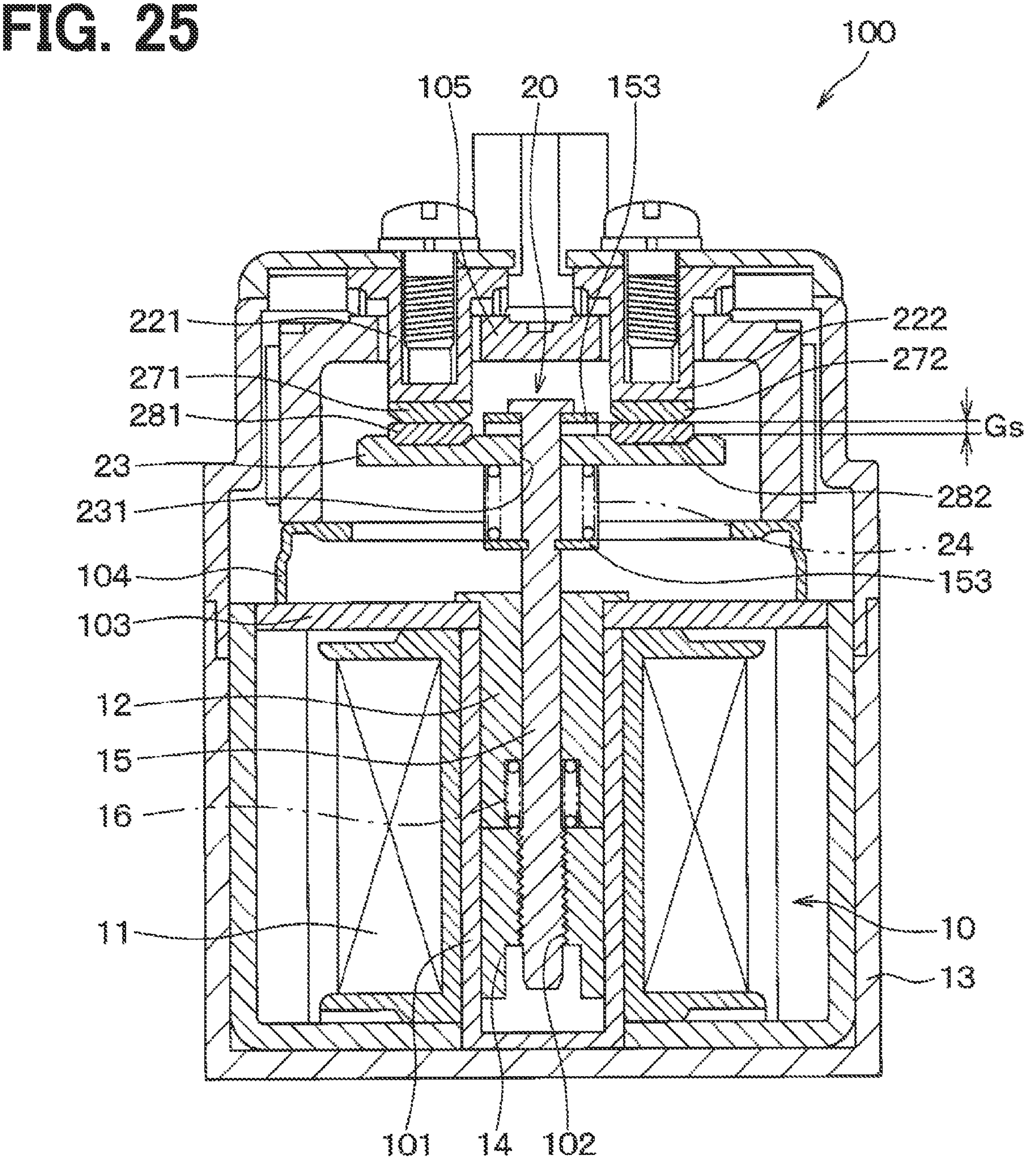
FIG. 25 is a cross-sectional view illustrating an on state of an electromagnetic relay of a comparative example.

On the other hand, as shown in FIG. 25, when the magnetizing coil 11 is energized during a current is supplied to, the movable core 14 is magnetically attracted to a side to the fixed core 12 against the urging force of the return spring 16, and comes into contact with the fixed core 12. Therefore, the shaft 15 moves to a side to the fixed terminal 22, and the contacts of the movable element 23 and the fixed terminal 22 come into contact with each other. Therefore, since the first fixed terminal 221 and the second fixed terminal 222 are electrically conducted through the movable element 23, the electromagnetic relay 100 of the comparative example is turned in the on state. In this state, a gap Gs is formed between a tip end of the shaft 15 and the movable element 23. This gap Gs is expressed by the following equation 2.

$$Gs=A-B \quad \text{(Equation 2)}$$

The electromagnetic relay 100 of the comparative example described above has a configuration in which the size of the gap Gs is adjusted by the screw mechanism 102 provided on the inner wall of the central hole of the movable core 14 and the outer wall of the shaft 15. Therefore, it provides a configuration in which the size of the gap Gs cannot be directly adjusted.

Further, the electromagnetic relay 100 of the comparative example provides a configuration in which a sealed space for sealing the arc extinguishing gas is formed by joining the bottomed cylindrical portion 101, the first joining member 103, the second joining member 104, and the sealing container 105. Therefore, in the case that a plurality of members for forming the closed space are joined by, for example, a welding process after adjusting the gap Gs, in the manufacturing process of the electromagnetic relay 1, heat of the welding process may be conducted to the drive unit 10 or the relay unit 20, there may be a possibility of generating differences of the gap Gs for each product.

The electromagnetic relay 1 of the present embodiment has the following effects with respect to the electromagnetic relay 100 of the comparative example described above.

(1) The electromagnetic relay 1 of the present embodiment is configured to make it possible both an adjustment of the press-fitting amount of the claw portion 31 and the recess 32 portion and an adjustment of the gap Gs between the ceramic insulator 18 at the end of the shaft 15 and the movable element 23 by making each of the relay unit 20 and the drive unit 10 in the manufacturing process to the same state as in when the magnetizing coil 11 is energized.

According to this, in the manufacturing process, the electromagnetic relay 1 enables to adjust the gap Gs while adjusting the press-fitting amount between the claw portions 31 and the recess portions 32, at a state before assembling the sealing member 40 and the inner cover 60 to an intermediate product in which the drive unit 10 and the relay unit 20 are combined. Then, after adjusting the gap Gs, the external connection terminal 50 fixed to the sealing member 40 and the fixed terminal 22 are joined, the sealing member 40 and the inner cover 60 are joined, and the arc extinguishing gas is injected into the closed space formed by the sealing member 40 and the inner cover 60. Therefore, since a potential process which may act stress on the drive unit 10 or the relay unit 20 after adjusting the gap Gs between the ceramic insulator 18 at the end of the shaft 15 and the movable element 23 is only a joining process for the external connection terminal 50 and the fixed terminal 22, it is possible to suppress changing of the gap Gs. Therefore, the electromagnetic relay 1 is possible to reduce differences of the gap Gs in a configuration in which the drive unit 10 and the relay unit 20 are accommodated in the closed space in which the arc extinguishing gas is sealed.

As described above, the electromagnetic relay 1 of the present embodiment can suppress a deformation by processing after adjusting the gap Gs, since it is not necessary to increase size of the return spring 16 and the magnetizing coil 11 considering differences of the gap Gs in order to satisfy the performance requirement index, it is possible to reduce size to the electromagnetic relay 1. A manufacturing cost may be reduced by suppressing a material cost by reducing the size of the electromagnetic relay 1. Further, a fuel efficiency of the vehicle in which the electromagnetic relay 1 is mounted may be improved by reducing a weight of the electromagnetic relay 1.

(2) The electromagnetic relay 1 of the embodiment has the joining surfaces 22*a* and 50*a* of the fixed terminals 22 and the external connection terminals 50 which are formed parallel to the axis Ax of the shaft 15. Thereby, when the external connection terminal 50 and the fixed terminal 22 are joined, it is possible to reduce a stress acting on the fixed terminal 22 in the axial direction of the shaft 15. Therefore, when the external connection terminal 50 and the fixed terminal 22 are joined, the fixed terminal 22 is prevented from being displaced in the axial direction of the shaft 15. Therefore, it is possible to prevent the displacement of the movable element 23 which comes into contact with the fixed terminal 22 while the magnetizing coil 11 is energized. Therefore, it is possible to suppress the gap Gs from changing after the gap Gs is set.

(3) The electromagnetic relay 1 of this embodiment includes the frame member 41 in an annular shape between the sealing member 40 and the inner cover 60. In this configuration, the entire circumference of one outer edge of the frame member 41 and the sealing member 40 are joined by brazing, and the entire circumference of the other outer edge of the frame member 41 and the flange 61 of the inner cover 60 are joined by resistance welding.

According to this, in the case that the sealing member 40 is formed by an insulating material such as ceramic and the inner cover 60 is formed by metal, it is possible to form reliably a closed space for sealing the arc-extinguishing gas by providing the frame member 41 in an annular shape between the sealing member 40 and the inner cover 60.

(4) The electromagnetic relay 1 of this embodiment includes an outer cover 70 with an insulating property. The outer cover 70 and the sealing member 40 are joined together, and the outer cover 70 and the sealing member 40 configure the outer shell of the electromagnetic relay 1.

According to this, it is possible to reduce the number of components by joining both the inner cover 60 and the outer cover 70 to the sealing member 40. Further, it is possible to prevent the electromagnetic relay 1 and external electrical components from being short circuited by forming both the outer cover 70 and the sealing member 40 from an insulating material.

(5) In the method for manufacturing the electromagnetic relay 1 of the present embodiment, the Gap Gs is adjusted when the drive unit 10 and the relay unit 20 are fixed by press-fitting the recess portions 32 provided in the frame 21 and the claw portions 31 provided in the yoke 13. The electromagnetic relay 1, which accommodates the drive unit 10 and the relay unit 20 in the closed space, is formed by joining the external connection terminal 50 fixed to the sealing member 40 and the fixed terminal 22, and joining the sealing member 40 and the inner cover 60, after the above process. Therefore, since a process which may apply stress on the drive unit 10 or the relay unit 20 after adjusting the gap Gs is only a joining process for the external connection terminal 50 and the fixed terminal 22, it is possible to suppress changing of the gap Gs. Therefore, according to the method for manufacturing the electromagnetic relay 1, it is possible to reduce differences of the gap Gs for each product in a configuration in which the drive unit 10 and the relay unit 20 are accommodated in the closed space in which the arc extinguishing gas is sealed.

(6) In the method for manufacturing the electromagnetic relay 1 of the present embodiment, the method of joining the external connection terminal 50 and the fixed terminal 22 is designed to be a method in which a thermal stress or a mechanical stress acting on the fixed terminal 22*a* is small as compared with a thermal stress or a mechanical stress acting on the external connection terminal 50.

Therefore, when the external connection terminal 50 and the fixed terminal 22 are joined, the fixed terminal 22 is prevented from being displaced in the axial direction of the shaft 15. Therefore, it is possible to suppress the gap Gs from changing after the gap Gs is set.

(7) In the method of manufacturing the electromagnetic relay 1 of the present embodiment, the inner cover 60 and the sealing member 40 are joined via the frame member 41. That is, it is employed a method in which the entire circumference of one outer edge of the frame member 41 and the sealing member 40 are joined by brazing, and then the entire circumference of the other outer edge of the frame member 41 and the inner cover 60 are joined by seam welding.

According to this, in the case that the sealing member 40 is formed by an insulating material such as ceramic and the inner cover 60 is formed by metal, it is possible to form reliably a closed space for sealing the arc-extinguishing gas by providing the frame member 41 between the sealing member 40 and the inner cover 60.

(8) The manufacturing method of the electromagnetic relay 1 of the present embodiment includes a process of configuring the outer shell of the electromagnetic relay 1 by the outer cover 70 and the sealing member 40 by joining the outer cover 70 with an insulating property covering the inner cover 60 and the sealing member 40.

According to this, it is possible to reduce the number of components by joining both the inner cover 60 and the outer cover 70 to the sealing member 40. Further, it is possible to prevent the electromagnetic relay 1 and external electrical components from being short circuited by forming both the outer cover 70 and the sealing member 40 from an insulating material.

Other Embodiments

The disclosure in the specification is not limited to the above described embodiments and may be suitably modified within a scope described in claims.

(1) For example, the gap Gs may be adjusted by adjusting a press-fitting amount of the insulating terminal 18 into the shaft 15.

(2) In the above embodiment, although the frame member 41 is arranged between the sealing member 40 and the inner cover 60, not limited to the above, the frame member 41 may be eliminated and the sealing member 40 and the inner cover 60 may be directly joined. In this case, the sealed space sealing the arc-extinguishing gas is formed by the sealing member 40 and the inner cover 60.

(3) In the above embodiment, although the insulating outer cover 70 is provided outside the inner cover 60, not limited to the above, the outer cover 70 may be eliminated.

Further, in each of the above-mentioned embodiments, it goes without saying that components of the embodiment are not necessarily essential except for a case in which the components are particularly clearly specified as essential components, a case in which the components are clearly considered in principle as essential components, and the like. Further, in each of the embodiments described above, when numerical values such as the number, numerical value, quantity, range, and the like of the constituent elements of the embodiment are referred to, except in the case where the numerical values are expressly indispensable in particular, the case where the numerical values are obviously limited to a specific number in principle, and the like, the present disclosure is not limited to the specific number. Furthermore, a shape, positional relationship or the like of a structural element, which is referred to in the embodiments described above, is not limited to such a shape, positional relationship or the like, unless it is specifically described or obviously necessary to be limited in principle.

What is claimed is:

1. An electromagnetic relay, comprising:

a drive unit including:

a magnetizing coil which forms a magnetic field by energization;

a fixed core which is placed on a side of an inner diameter of the magnetizing coil;

a yoke which accommodates the magnetizing coil and the fixed core; a movable core which is movable relative to the fixed core;

a shaft which is able to reciprocate in an axial direction and is fixed to the movable core; and a return spring which urges the movable core in a direction away from the fixed core;

a relay unit including:

a frame made of an insulating material;

a fixed terminal fixed to the frame;

a movable element which is provided on a side opposite to the movable core with respect to the fixed terminal and is movable relative to the fixed terminal; and a contact pressure spring which urges the movable element to a side to the fixed terminal;

a press-fit fixing portion which fixes the drive unit and the relay unit by press-fitting a claw portion provided on one of the yoke or the frame and a recess portion provided on the other one;

a sealing member in a plate-shape which is provided outside the relay unit and the drive unit;

an external connection terminal which is fixed to the sealing member while being inserted through a hole of the sealing member, and is joined to the fixed terminal; and an inner cover which is joined to the sealing member in a state in which the drive unit and the relay unit are accommodated therein, and forms a sealed space for sealing an arc-extinguishing gas therein together with the sealing member, wherein the electromagnetic relay is configured to be able to adjust a gap between an end of the shaft and the movable element and be able to adjust a press-fitting amount between the claw portion and the recess portion, by bringing them into a state where a movable contact of the movable element and a fixed contact of the fixed terminal come into contact with each other, and a movable component and the fixed core come into contact with each other, in a state before attaching the sealing member and the inner cover.

2. The electromagnetic relay according to claim 1, wherein joint surfaces between the external connection terminal and the fixed terminal are formed parallel to an axis of the shaft.

3. The electromagnetic relay according to claim 1, further comprising:

a frame member in an annular shape which is provided between the sealing member and the inner cover, wherein an entire circumference of one outer edge of the frame member and the sealing member are joined by brazing, and an entire circumference of the other outer edge of the frame member and the inner cover are joined by welding or brazing.

4. The electromagnetic relay according to claim 1, further comprising:

an outer cover with an insulating property which covers the inner cover, wherein the outer cover and the sealing member form an outer shell of the electromagnetic relay by fixing the outer cover and the sealing member each other.

5. A method of manufacturing an electromagnetic relay, comprising the steps of:

preparing a drive unit in which a magnetizing coil which forms a magnetic field by energization, a fixed core which is placed on a side of an inner diameter of the magnetizing coil, a yoke which accommodates the magnetizing coil and the fixed core, a movable core which is movable relative to the fixed core, a shaft which is able to reciprocate in an axial direction and is fixed to the movable core and a return spring which urges the movable core in a direction away from the fixed core are assembled;

preparing a relay unit in which a frame made of an insulating material, a fixed terminal fixed to the frame, a movable element which is provided on a side opposite to the movable core with respect to the fixed terminal and is movable relative to the fixed terminal, and a contact pressure spring which urges the movable element to a side to the fixed terminal are assembled;

fixing the drive unit and the relay unit by adjusting a press-fitting amount of a claw portion provided on one of the yoke or the frame and a recess portion provided on the other one so that a gap between an end of the shaft and the movable element is adjusted to have a predetermined size in a state where a movable contact included in the movable element and a fixed contact included in the fixed terminal are brought into contact with each other and a movable component and the fixed core are brought into contact with each other;

fixing a sealing member and an external connection terminal in a state where the external connection terminal is inserted through a hole of the sealing member in a plate shape;

joining the external connection terminal and the fixed terminal while arranging the sealing member to which the external connection terminal is fixed on an outside of the relay unit and the drive unit;

forming a sealed space inside an inner cover and the sealing member by joining an inner cover in which the drive unit and the relay unit are accommodated therein and the sealing member; and sealing an arc-extinguishing gas in the sealed space formed inside the inner cover and the sealing member.

6. The method of manufacturing an electromagnetic relay according to claim 5, wherein joining the external connection terminal and the fixed terminal is designed to be a method in which a thermal stress or a mechanical stress acting on the fixed terminal is small as compared with a thermal stress or a mechanical stress acting on the external connection terminal.

7. The method of manufacturing an electromagnetic relay according to claim 5, wherein joining the inner cover and the sealing member is performed by brazing an entire circumference of one outer edge of a frame member in an annular shape provided between the sealing member and the inner cover and the sealing member, after that, by joining an entire circumference of the other outer edge of the frame member and the inner cover by welding or brazing.

8. The method of manufacturing an electromagnetic relay according to claim 5, wherein configuring an outer shell of the electromagnetic relay by an outer cover and the sealing member by joining the outer cover with an insulating property covering the inner cover and the sealing member.

* * * * *